(12) United States Patent
Min

(10) Patent No.: US 11,804,083 B2
(45) Date of Patent: Oct. 31, 2023

(54) PASSIVE ELECTRONIC LOCKS AND METHODS OF USING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD, Nanjing (CN)

( * ) Notice: Subject to any disclaimer, the term of this patent is extended or adjusted under 35 U.S.C. 154(b) by 0 days.

(21) Appl. No.: 16/971,015

(22) PCT Filed: Aug. 19, 2020

(86) PCT No.: PCT/CN2020/109929
§ 371 (c)(1),
(2) Date: Aug. 19, 2020

(87) PCT Pub. No.: WO2022/032700
PCT Pub. Date: Feb. 17, 2022

(65) Prior Publication Data
US 2023/0169806 A1 Jun. 1, 2023

(30) Foreign Application Priority Data
Aug. 13, 2020 (WO) ................ PCT/CN2020/108943

(51) Int. Cl.
*G07C 9/00* (2020.01)
*H04L 9/14* (2006.01)
(Continued)

(52) U.S. Cl.
CPC ............ *G07C 9/00182* (2013.01); *H04L 9/14* (2013.01); *E05G 1/005* (2013.01); *E05G 1/04* (2013.01); *G07C 2009/0023* (2013.01)

(58) Field of Classification Search
CPC ........ G07C 9/00182; G07C 2009/0023; H04L 9/14; E05G 1/005; E05G 1/04
See application file for complete search history.

(56) References Cited

U.S. PATENT DOCUMENTS 9,858,778 B2 * 1/2018 Fawcett ............. G08B 13/1463
10,210,681 B1 * 2/2019 Grant ........................ G07C 9/27
(Continued)

FOREIGN PATENT DOCUMENTS

CN 111779033 A * 10/2020

*Primary Examiner* — Yonas A Bayou
(74) *Attorney, Agent, or Firm* — Ming Jiang; MM IP SERVICES LLC

(57) ABSTRACT

The present disclosure relates an electronic locking system. In certain embodiments, the electronic locking system includes a passive electronic lock, active electronic key and passive electronic key. The passive electronic key stores a passive digital key, and the active electronic key stores an active digital key. Each of passive and active electronic keys includes a communication channel and an electronic key power supply port. The active electronic key includes electrical power source providing electrical power supply to active electronic key, passive electronic lock and passive electronic key through passive electronic lock to operate passive electronic lock. When both active and passive electronic keys are inserted into respective electronic keyholes of passive electronic lock, both active and passive digital keys are transmitted to passive electronic lock, passive electronic lock can be locked and unlocked only when both active and passive digital keys received match prestored active and passive digital keys respectively.

20 Claims, 10 Drawing Sheets

(51) Int. Cl.
     *E05G 1/00*         (2006.01)
     *E05G 1/04*         (2006.01)

(56)             References Cited

U.S. PATENT DOCUMENTS

| | | | |
|---|---|---|---|
| 10,297,139 B2* | 5/2019 | Fawcett | G08B 13/2402 |
| 10,395,455 B2* | 8/2019 | Murar | G07C 9/28 |
| 10,789,792 B2* | 9/2020 | Grange | H04B 5/0037 |
| 11,017,656 B2* | 5/2021 | Fawcett | G08B 13/14 |
| 11,399,287 B2* | 7/2022 | Soryal | H04W 4/40 |
| 2012/0047972 A1* | 3/2012 | Grant | E05B 47/06 |
| | | | 70/77 |
| 2013/0113602 A1* | 5/2013 | Gilbertson | G07C 9/257 |
| | | | 340/5.52 |
| 2016/0078702 A1* | 3/2016 | Grant | E05B 65/0894 |
| | | | 70/278.2 |
| 2017/0372543 A1* | 12/2017 | Grant | G07C 9/00857 |
| 2019/0057563 A1* | 2/2019 | Grant | G07C 9/27 |
| 2019/0147675 A1* | 5/2019 | Grant | G08B 13/1445 |
| | | | 340/5.25 |
| 2019/0272689 A1* | 9/2019 | Grant | G07C 9/00857 |
| 2020/0234522 A1* | 7/2020 | Grant | G08B 13/1445 |

\* cited by examiner

PASSIVE ELECTRONIC LOCKS AND
METHODS OF USING THE SAME

FIELD

The present disclosure generally relates to electronic locking system, and more particularly to passive electronic locks, and methods of using the passive electronic locks.

BACKGROUND

Safe deposit box is a secure container usually made of metal that's used to store valuables at a bank or credit union. These boxes are often kept in vaults and can be rented throughout the lifetime of a customer for an annual fee. Usually, opening the safe deposit box requires at least two keys, one for a bank management staff, and the other one for the customer. Both keys are required to open the safe deposit box. Currently, most banks still use mechanical safe deposit boxes with a set of keys. These mechanical lock's keys are easy to duplicate and the safety of the contents in the safe deposit box is not guaranteed. It is desirable to have electronic locks with electronic keys that people are unable to duplicate.

Therefore, heretofore unaddressed needs still exist in the art to address the aforementioned deficiencies and inadequacies.

SUMMARY

In one aspect, the present disclosure relates to a passive electronic lock. In certain embodiments, the passive electronic lock includes a set of electronic keyholes and an electronic lock controller. The set of electronic keyholes receives a set of electronic keys. The set of electronic keyholes includes an active electronic keyhole and at least one passive electronic keyhole. The active electronic keyhole receives an active electronic key and the passive electronic keyhole receives a passive electronic key. The active electronic key includes an electrical power source. The electrical power source provides electrical power supply to the active electronic key, the passive electronic lock and the passive electronic key.

In certain embodiments, the electronic lock controller includes an electronic lock processor, and a non-volatile memory of the electronic lock. The non-volatile memory of the electronic lock stores an electronic lock operating system and electronic lock computer executable instructions, and the electronic lock computer executable instructions includes: a digital key storage module, a digital key control module, a digital key encryption/decryption module, a digital key authentication module, an electrical power module, and an electronic lock control module.

In certain embodiments, when executed by the electronic lock processor, the electronic lock computer executable instructions cause the electronic lock processor to:

receive, via the electrical power module, electrical power from an active electronic key power supply port of the electronic lock controller from the electrical power source of the active electronic key, when a first user inserts the active electronic key into the active electronic keyhole;

provide, via the electrical power module, electrical power to the passive electronic key through a passive electronic key power supply port of the electronic lock controller, when a second user inserts the passive electronic key into the passive electronic keyhole;

receive an active digital key from the active electronic key via an active communication channel of the electronic lock controller, and a passive digital key from the passive electronic key via a passive communication channel of the electronic lock controller, respectively;

compare, by the digital key control module, the active digital key and the passive digital key received with an active digital key and a passive digital key prestored in the digital key storage module; and operate, by the electronic lock control module through an electronic locking mechanism, an electronic lock tongue to lock or unlock the passive electronic lock, when the digital key authentication module determines that the active digital key and the passive digital key received match the active digital key and the passive digital key prestored in the digital key storage module, respectively.

In certain embodiments, the passive electronic lock is to be locked and unlocked only when the active electronic key and the passive electronic key are simultaneously inserted into the active electronic keyhole and the passive electronic keyhole, respectively. In certain embodiments, the first user is a management staff of the passive electronic lock and uses the active electronic key, the second user is a customer and uses the passive electronic key.

In certain embodiments, when the active electronic key is inserted into the active electronic keyhole and the passive electronic key is inserted into the passive electronic keyhole, respectively, the active digital key from the active electronic key is encrypted by a digital key encryption/decryption module of the active electronic key and transmitted to the passive electronic lock, and the passive digital key from the passive electronic key is encrypted by a digital key encryption/decryption module of the passive electronic key and transmitted to the passive electronic lock.

In certain embodiments, the active digital key and the passive digital key received are decrypted by the digital key encryption/decryption module and authenticated by the digital key control module of the passive electronic lock. The electronic lock control module operates the electronic lock tongue through the electronic locking mechanism to lock or unlock the passive electronic lock, when the digital key authentication module determines that the active digital key and the passive digital key received match the active digital key and the passive digital key prestored in the digital key storage module, respectively.

In certain embodiments, during an activation process of the passive electronic lock, the first user triggers an electronic lock activation mechanism, the digital key control module of the passive electronic lock sends an activation instruction to the active electronic key and the passive electronic key through the active communication channel and the passive communication channel, respectively. The activation instruction instructs a digital key control module of the active electronic key to generate an active digital key for the active electronic key and the digital key control module of the passive electronic key to generate a passive digital key for the passive electronic key. The active digital key generated is stored in a digital key storage module of the active electronic key and the passive digital key generated is stored in a digital key storage module of the passive electronic key. The active digital key generated is encrypted by a digital key en/decryption module of the active electronic key and transmitted to the electronic lock digital key storage module as the active digital key prestored, and the passive digital key generated is encrypted by a digital key en/decryption module of the passive electronic key and transmitted to the electronic lock digital key storage module as the passive digital key prestored. The active digital key prestored and the passive digital key prestored are used for authentication of the active electronic key and the passive electronic key, respectively.

In certain embodiments, the active electronic keyhole includes at least two active electronic keyhole contacts and the active electronic keyhole receives the active electronic key. The passive electronic keyhole includes at least two passive electronic keyhole contacts and the passive electronic keyhole receives the passive electronic key.

In certain embodiments, the passive electronic lock includes two or more communication channels. These communication channels include at least the active communication channel for transmitting the active digital key between the active electronic key and the passive electronic lock and, and at least the passive communication channel for transmitting the passive digital key between the passive electronic key and the passive electronic lock.

In certain embodiments, the passive electronic lock includes two or more electronic key power supply ports. These electronic key power supply ports include the active electronic key power supply port for receiving electrical power supply from the active electronic key, and the passive electronic key power supply port for providing electrical power supply to the passive electronic key from the active electronic key through the passive electronic lock.

In another aspect, the present disclosure relates to an electronic locking system. In certain embodiments, the electronic locking system includes: a passive electronic lock, and a set of electronic keys. The set of electronic keys includes an active electronic key and at least one passive electronic key.

In certain embodiments, the passive electronic lock includes a set of electronic keyholes and an electronic lock controller. The set of electronic keyholes receives the set of electronic keys. The set of electronic keyholes includes an active electronic keyhole and at least one passive electronic keyhole. The active electronic keyhole receives the active electronic key and the passive electronic keyhole receives the passive electronic key. The active electronic key includes an electrical power source. The electrical power source provides electrical power supply to the active electronic key, the passive electronic lock and the passive electronic key.

In certain embodiments, the electronic lock controller includes an electronic lock processor, and a non-volatile memory of the electronic lock. The non-volatile memory of the electronic lock stores an electronic lock operating system and electronic lock computer executable instructions, and the electronic lock computer executable instructions includes: a digital key storage module, a digital key control module, a digital key encryption/decryption module, a digital key authentication module, an electrical power module, and an electronic lock control module.

In certain embodiments, when executed by the electronic lock processor, the electronic lock computer executable instructions cause the electronic lock processor to:

receive, via the electrical power module, electrical power from an active electronic key power supply port of the electronic lock controller from the electrical power source of the active electronic key, when a first user inserts the active electronic key into the active electronic keyhole;

provide, via the electrical power module, electrical power to the passive electronic key through a passive electronic key power supply port of the electronic lock controller, when a second user inserts the passive electronic key into the passive electronic keyhole;

receive an active digital key from the active electronic key via an active communication channel of the electronic lock controller, and a passive digital key from the passive electronic key via a passive communication channel of the electronic lock controller, respectively;

compare, by the digital key control module, the active digital key and the passive digital key received with an active digital key and a passive digital key prestored in the digital key storage module; and operate, by the electronic lock control module through an electronic locking mechanism, an electronic lock tongue to lock or unlock the passive electronic lock, when the digital key authentication module determines that the active digital key and the passive digital key received match the active digital key and the passive digital key prestored in the digital key storage module, respectively.

In certain embodiments, the passive electronic lock is to be locked and unlocked only when the active electronic key and the passive electronic key are simultaneously inserted into the active electronic keyhole and the passive electronic keyhole, respectively. In certain embodiments, the first user is a management staff of the passive electronic lock and uses the active electronic key, the second user is a customer and uses the passive electronic key.

In certain embodiments, when the active electronic key is inserted into the active electronic keyhole and the passive electronic key is inserted into the passive electronic keyhole, respectively, the active digital key from the active electronic key is encrypted by a digital key encryption/decryption module of the active electronic key and transmitted to the passive electronic lock, and the passive digital key from the passive electronic key is encrypted by a digital key encryption/decryption module of the passive electronic key and transmitted to the passive electronic lock.

In certain embodiments, the active digital key and the passive digital key received are decrypted by the digital key encryption/decryption module and authenticated by the digital key control module of the passive electronic lock. The electronic lock control module operates the electronic lock tongue through the electronic locking mechanism to lock or unlock the passive electronic lock, when the digital key authentication module determines that the active digital key and the passive digital key received match the active digital key and the passive digital key prestored in the digital key storage module, respectively.

In certain embodiments, during an activation process of the passive electronic lock, the first user triggers an electronic lock activation mechanism, the digital key control module of the passive electronic lock sends an activation instruction to the active electronic key and the passive electronic key through the active communication channel and the passive communication channel, respectively. The activation instruction instructs a digital key control module of the active electronic key to generate an active digital key for the active electronic key and the digital key control module of the passive electronic key to generate a passive digital key for the passive electronic key. The active digital key generated is stored in a digital key storage module of the active electronic key and the passive digital key generated is stored in a digital key storage module of the passive electronic key. The active digital key generated is encrypted by a digital key en/decryption module of the active electronic key and transmitted to the electronic lock digital key storage module as the active digital key prestored, and the passive digital key generated is encrypted by a digital key en/decryption module of the passive electronic key and transmitted to the electronic lock digital key storage module as the passive digital key prestored. The active digital key prestored and the passive digital key prestored are used for authentication of the active electronic key and the passive electronic key, respectively.

In certain embodiments, the active electronic keyhole includes at least two active electronic keyhole contacts and the active electronic keyhole receives the active electronic key. The passive electronic keyhole includes at least two passive electronic keyhole contacts and the passive electronic keyhole receives the passive electronic key.

In certain embodiments, the passive electronic lock includes two or more communication channels. These communication channels include at least the active communication channel for transmitting the active digital key between the active electronic key and the passive electronic lock and, and at least the passive communication channel for transmitting the passive digital key between the passive electronic key and the passive electronic lock.

In certain embodiments, the passive electronic lock includes two or more electronic key power supply ports. These electronic key power supply ports include the active electronic key power supply port for receiving electrical power supply from the active electronic key, and the passive electronic key power supply port for providing electrical power supply to the passive electronic key from the active electronic key through the passive electronic lock.

In yet another aspect, the present disclosure relates to a method of using an electronic locking system. In certain embodiments, the method includes:

installing the electronic locking system, the electronic locking system includes: a passive electronic lock having a set of electronic keyholes, an active electronic key and at least one passive electronic key;

inserting, by a first user, the active electronic key into an active electronic keyhole of the passive electronic lock, wherein the active electronic key comprises an electrical power source to provide electrical power supply to the passive electronic lock through an active electronic key power supply port of the active electronic key, and providing, by the active electronic key, an active digital key to the passive electronic lock through an active communication channel of the active electronic key;

inserting, by a second user while the active electronic key is inserted in the active electronic keyhole, the passive electronic key into a passive electronic keyhole of the passive electronic lock to receive electrical power supply through a passive electronic key power supply port from the passive electronic lock, and providing, by the passive electronic key, a passive digital key to the passive electronic lock through a passive communication channel of the passive electronic key;

comparing, by a digital key control module of the passive electronic lock, the active digital key and the passive digital key received with an active digital key and a passive digital key prestored in a digital key storage module of the passive electronic lock; and operating, by an electronic lock control module of the passive electronic lock, an electronic lock tongue of the passive electronic lock through an electronic locking mechanism to lock and unlock the passive electronic lock, when a digital key authentication module of the passive electronic lock determines that the active digital key and the passive digital key received match the active digital key and the passive digital key prestored in the digital key storage module of the passive electronic lock, respectively.

In certain embodiments, each of the active electronic key and the passive electronic key includes an electronic key processor, and a non-volatile memory. The non-volatile memory stores an operating system and computer executable instructions. The computer executable instructions include: a digital key control module, a digital key storage module, a digital key encryption/decryption module, and an electrical power module.

In certain embodiments, the digital key control module of the active electronic key generates an active digital key for the active electronic key and the digital key control module of the passive electronic key generates a passive digital key for the passive electronic key during an activation process of the passive electronic lock. The active digital key and the passive digital key generated are stored in the digital key storage module of the active electronic key and the passive electronic key, respectively. The active digital key and the passive digital key generated are then encrypted using a digital key encryption/decryption module of the active electronic key and the passive electronic key, respectively, transmitted to and stored in the digital key storage module of the passive electronic lock, respectively, for authentication of the active electronic key and the passive electronic key.

In certain embodiments, the digital key storage module of the active electronic key receives and stores the active digital key from the digital key control module of the active electronic key, and the digital key storage module of the passive electronic key receives and stores the passive digital key from the digital key control module of the passive electronic key.

In certain embodiments, the digital key encryption/decryption module of the active electronic key encrypts the active digital key before being transmitted out, and the digital key encryption/decryption module of the passive electronic key encrypts the passive digital key before being transmitted out.

In certain embodiments, the electrical power module of the active electronic key receives electrical power supply from the electrical power source and provides electrical power supply to the passive electronic lock, and the electrical power module of the passive electronic key receives electrical power supply from the active electronic key through the passive electronic lock.

In certain embodiments, the passive electronic lock includes an electronic lock controller. The electronic lock controller includes an electronic lock processor and a non-volatile memory of the electronic lock. The non-volatile memory of the electronic lock stores an electronic lock operating system and electronic lock computer executable instructions. The electronic lock computer executable instructions includes: the digital key storage module, the digital key control module, a digital key encryption/decryption module, the digital key authentication module, an electrical power module, and the electronic lock control module.

In certain embodiments, the digital key storage module receives the active digital key from the active electronic key and the passive digital key from the passive electronic key generated during an activation process of the passive electronic lock, and stores the active digital key and the passive digital key received in the digital key storage module of the passive electronic lock as the active digital key and the passive digital key prestored in the digital key storage module for authentication of the active electronic key and the passive electronic key, respectively.

In certain embodiments, the digital key control module receives the active digital key when the active electronic key is inserted in the active electronic keyhole and the passive digital key when the passive electronic key is inserted in the passive electronic keyhole, and compares the active digital key and the passive digital key received with the active digital key and the passive digital key prestored in the digital key storage module.

In certain embodiments, the digital key encryption/decryption module decrypts the active digital key and the passive digital key received.

In certain embodiments, the digital key authentication module determines whether the active digital key and the passive digital key received match the active digital key and the passive digital key prestored in the digital key storage module.

In certain embodiments, the electrical power module receives electrical power supply from the electrical power source of the active electronic key through the active electronic key power supply port and provides electrical power supply to the passive electronic key through the passive electronic key power supply port.

In certain embodiments, the electronic lock control module controls the operation of the electronic locking mechanism to lock and unlock the electronic locking system.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

Figure 1:
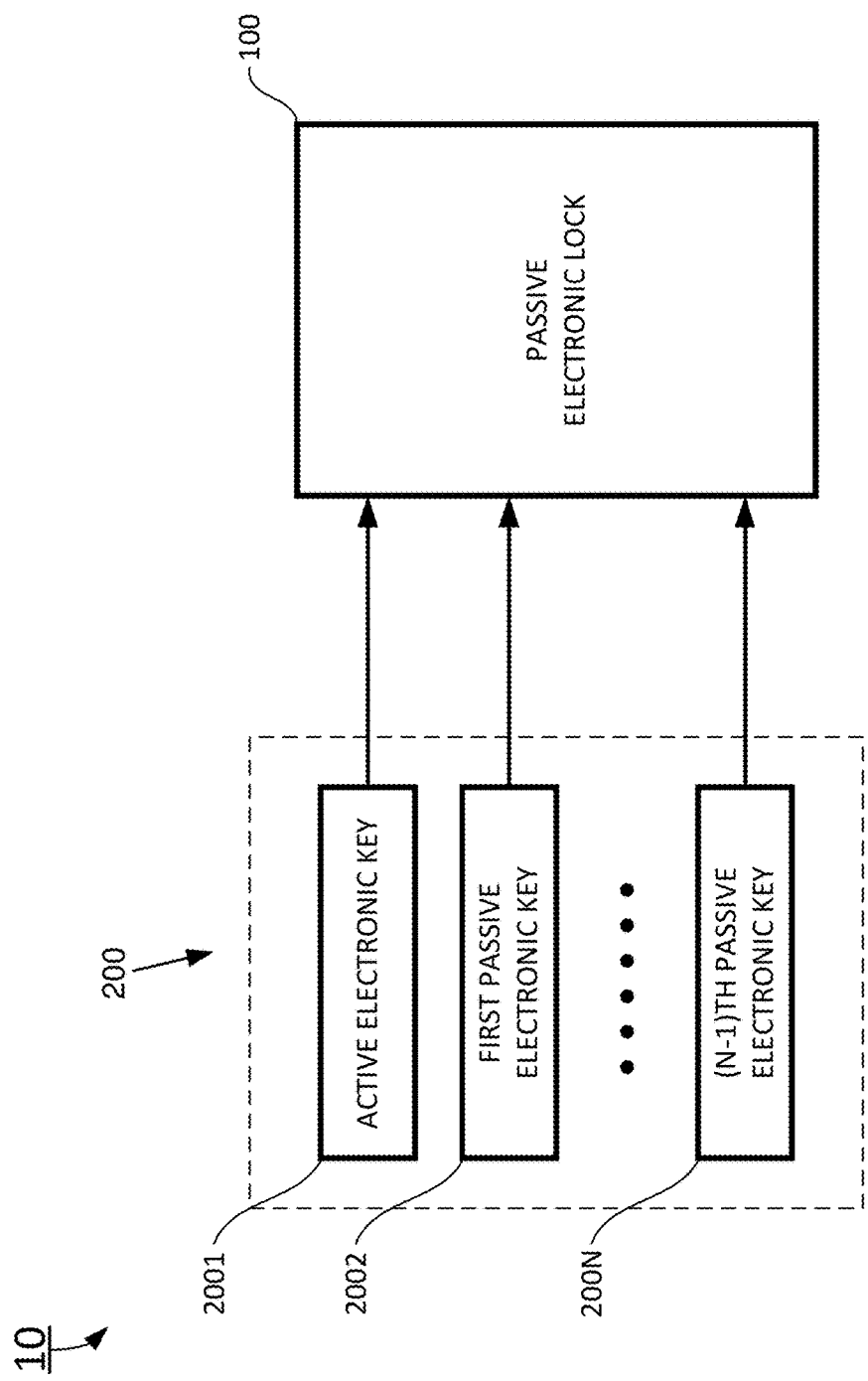
FIG. 1 is a block diagram illustrating an electronic locking system having a passive electronic lock and a set of electronic keys according to certain embodiments of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

Figure 8:
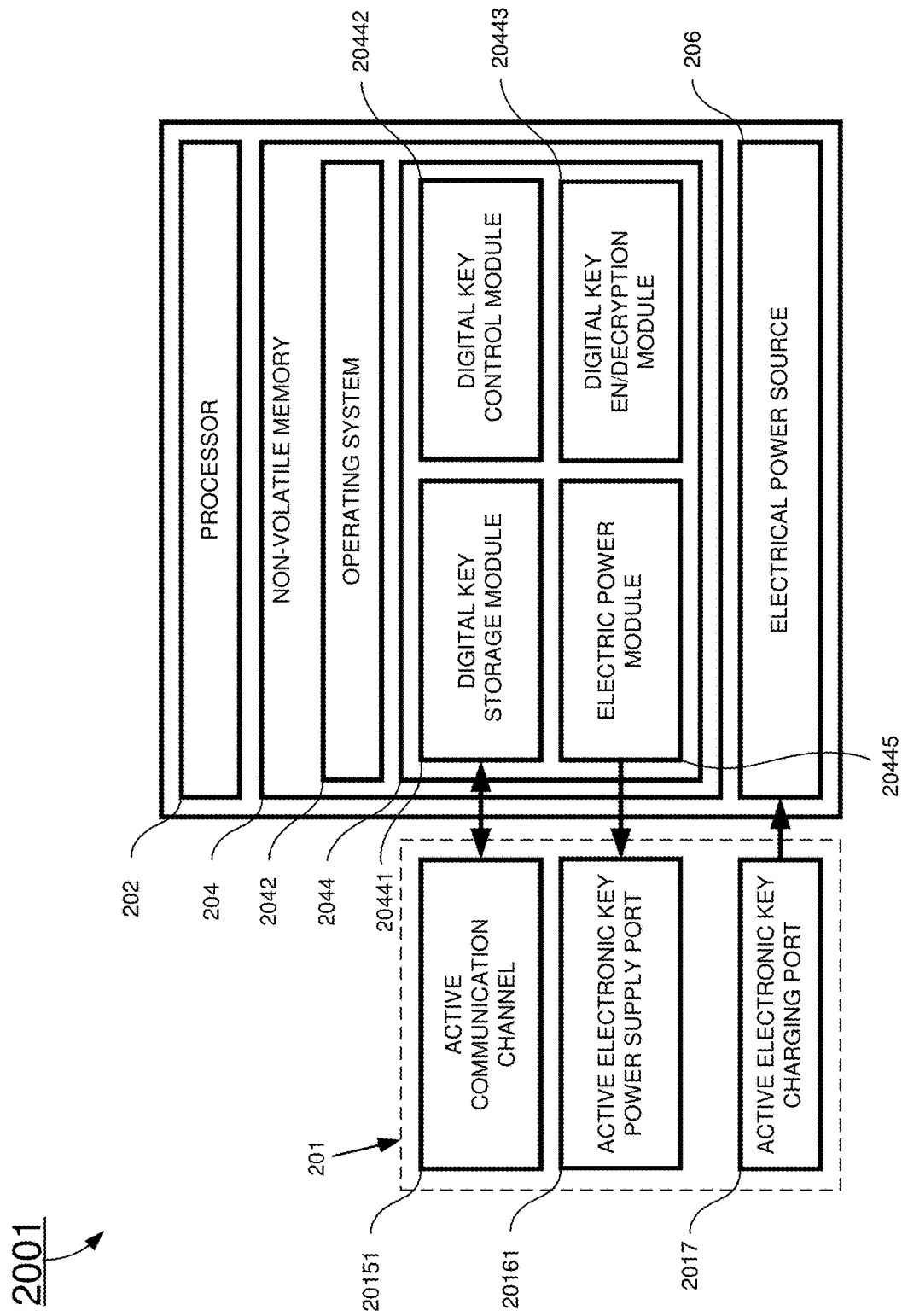
FIG. 8 is a block diagram of an exemplary active electronic key according to certain embodiments of the present disclosure.
Figure 9:
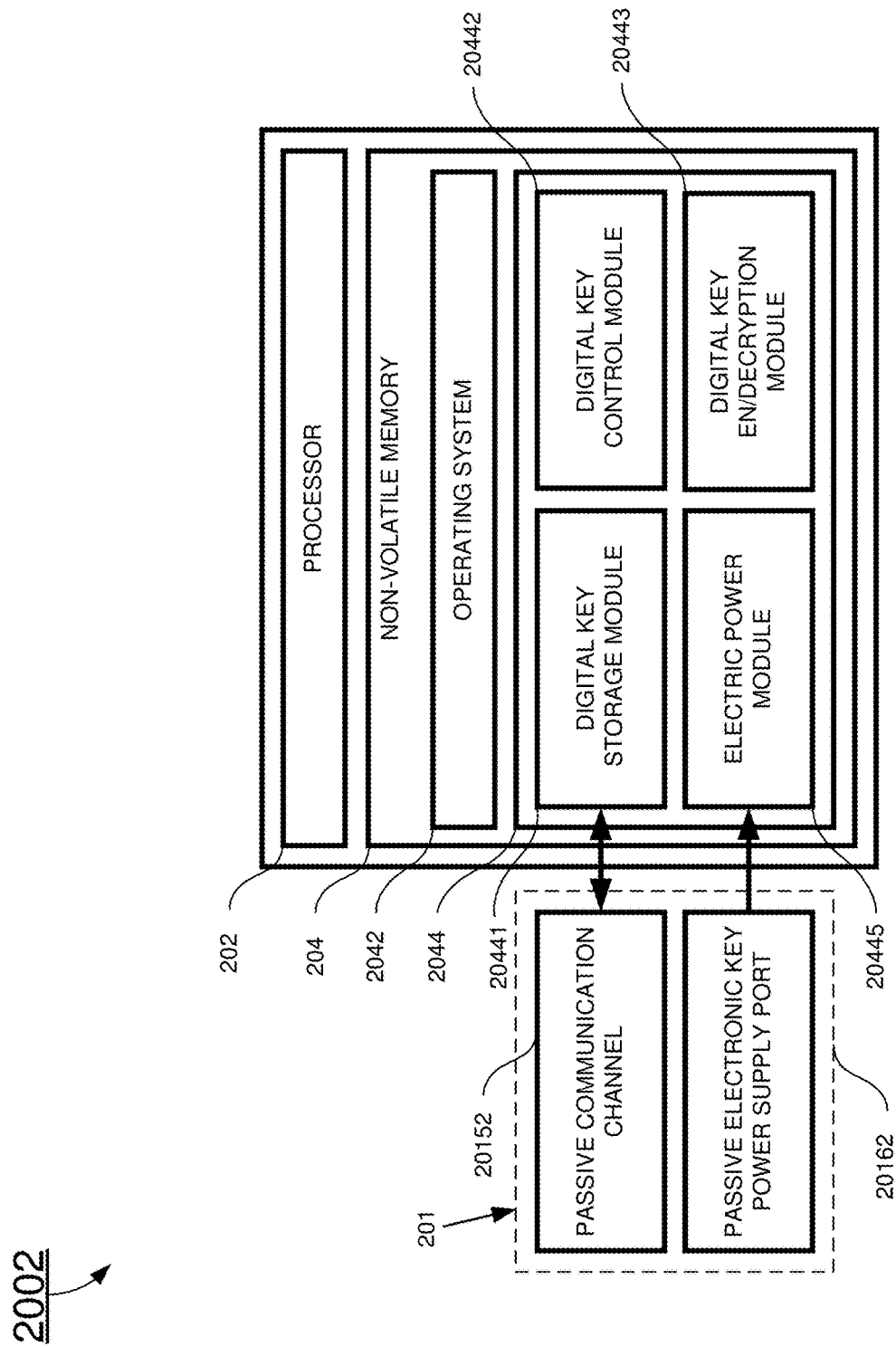
FIG. 9 is block diagram of an exemplary passive electronic key according to certain embodiments of the present disclosure.

As used herein, the term electronic key is defined as a physical key to electronically operate an electronic lock. The electronic key may include electronic circuit, electronic modules, processor, memory, as well many other electronic components. The electronic key may include active electronic key and passive electronic key. The active electronic key includes electrical power source, as shown in FIG. 8 and the passive electronic key does not have electrical power source, as shown in FIG. 9.

As used herein, the term digital key is defined as a digital code stored in the physical electronic key to electronically operate the electronic lock. The active electronic key may store an active digital key, and the passive electronic key may store a passive digital key. In order to increase security of the electronic lock, these digital keys may be encrypted during the transmission of the digital keys between the electronic keys and the electronic lock.

As used herein, the phrase at least one of A, B, and C should be construed to mean a logical (A or B or C), using a non-exclusive logical OR. It should be understood that one or more steps within a method may be executed in different order (or conconventionally) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring now to FIG. 1, an electronic locking system 10 is shown according to certain embodiments of the present disclosure. The electronic locking system 10 includes a passive electronic lock 100, and a set of electronic keys 200. In this embodiment, the set of electronic keys 200 includes N electronic keys: an active electronic key 2001, a first passive electronic key 2002, . . . , and an (N−1)th passive electronic key 200N. When the passive electronic lock 100 is equipped with N keyholes, then all N electronic keys 200 are required to lock and unlock the passive electronic lock 100.

Figure 2:
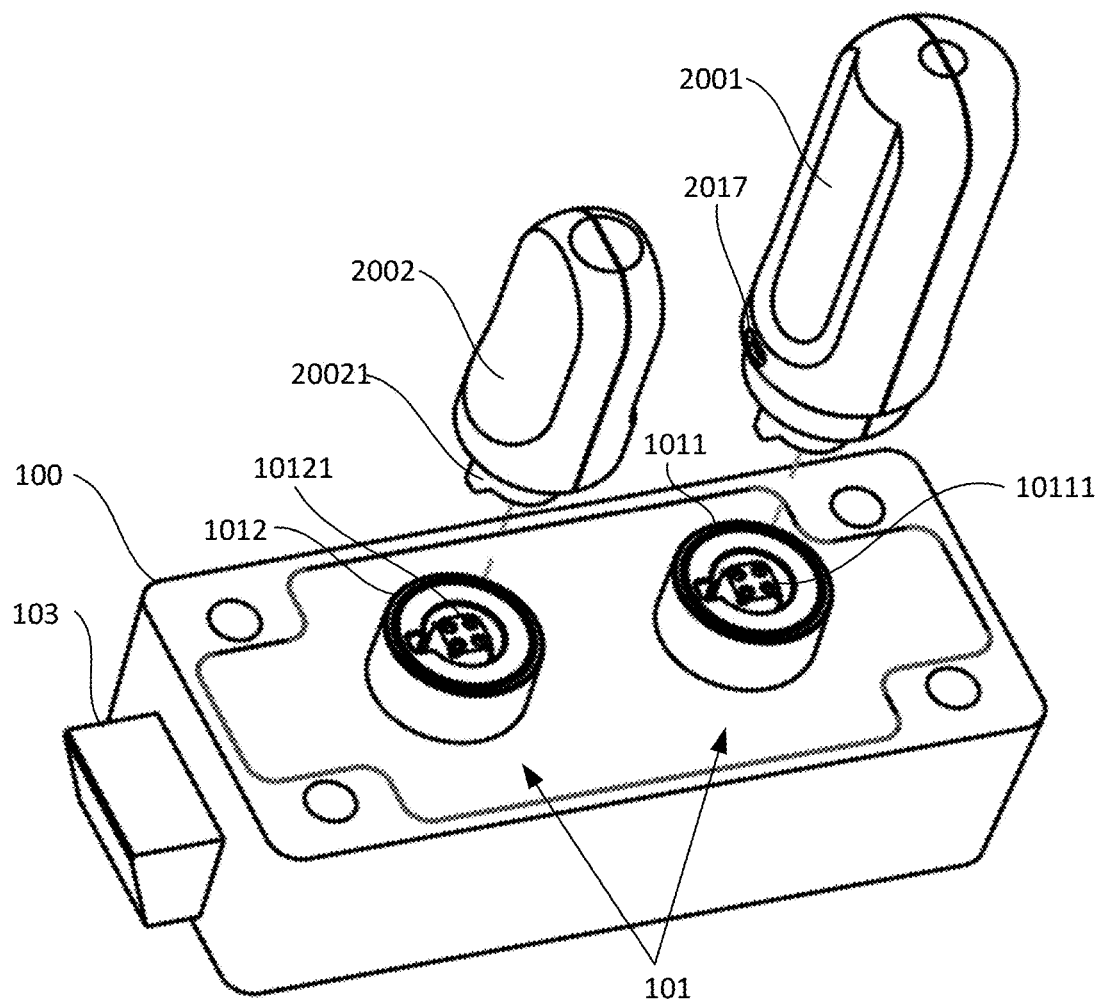
FIG. 2 is a perspective view of the passive electronic lock having an active electronic keyhole, a passive electronic keyhole, an active electronic key, and a passive electronic key when the active electronic key and the passive electronic key are not inserted into the active electronic keyhole and the passive electronic keyhole of the passive electronic lock, respectively, according to certain embodiments of the present disclosure.
Figure 3:
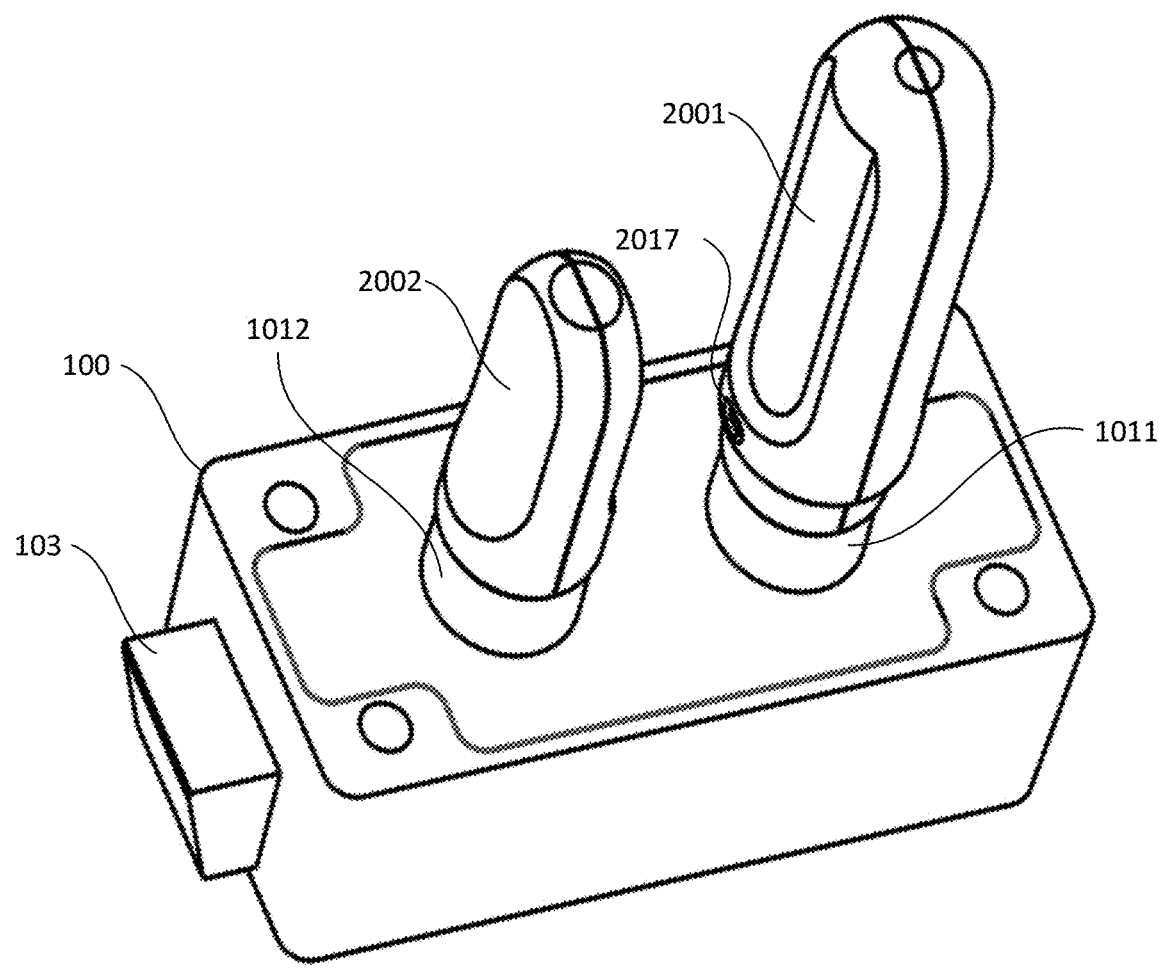
FIG. 3 is a perspective view of the passive electronic lock having the active electronic keyhole, the passive electronic keyhole, the active electronic key, and the passive electronic key when the active electronic key and the passive electronic key are inserted into the active electronic keyhole and the passive electronic keyhole of the passive electronic lock, respectively, according to certain embodiments of the present disclosure.
Figure 4:
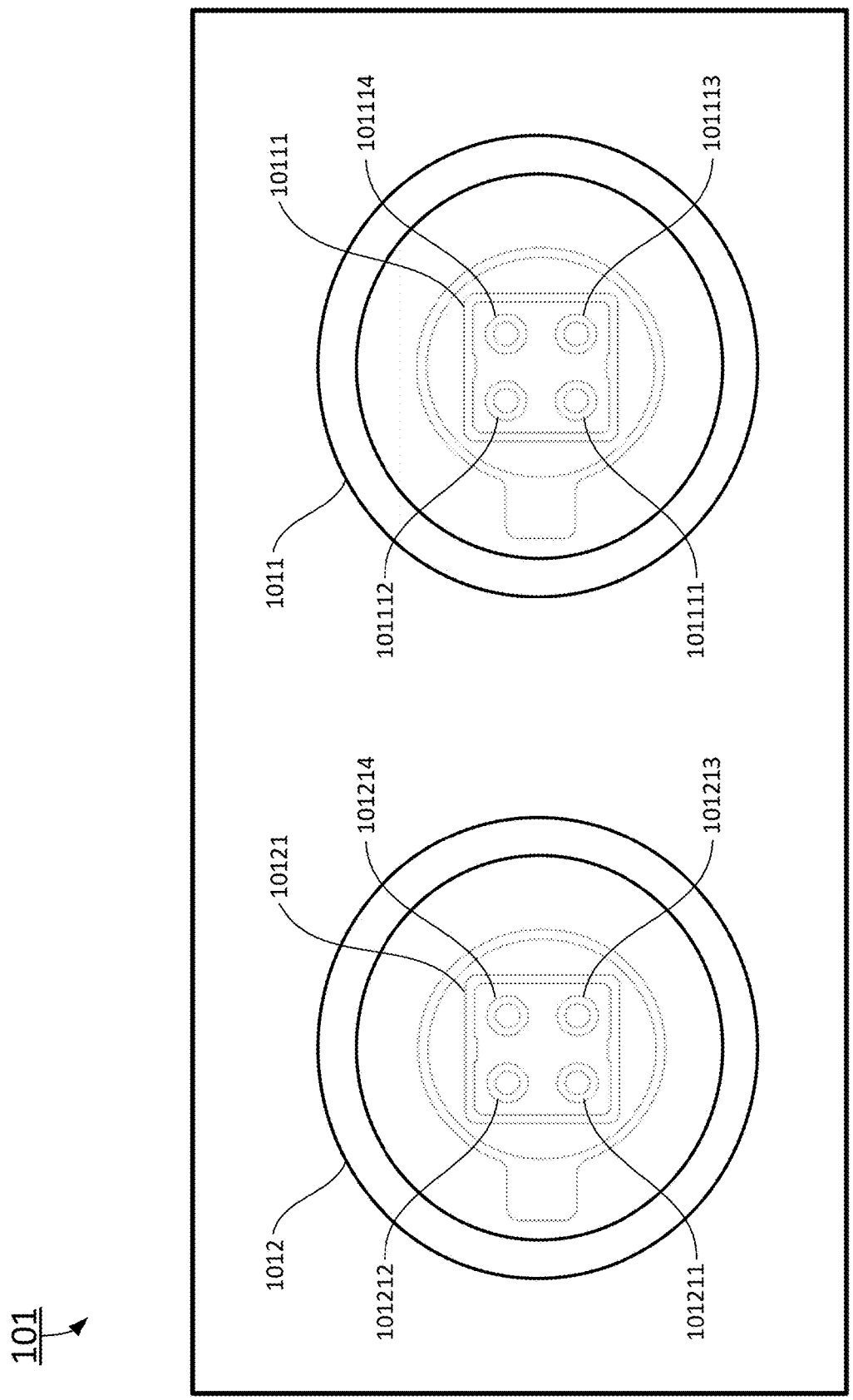
FIG. 4 shows exemplary sets of the active electronic keyhole contacts and the passive electronic keyhole contacts of the passive electronic lock as shown in FIG. 4 according to certain embodiments of the present disclosure.

In one embodiment, as shown in FIG. 2, the electronic locking system 10 includes the passive electronic lock 100 having an active electronic keyhole 1011, a passive electronic keyhole 1012, the active electronic key 2001 and a passive electronic key 2002. In this case, both the active electronic key 2001 and the passive electronic key 2002 are required to lock and unlock the passive electronic lock 100, as shown in FIG. 3. FIG. 4 shows exemplary sets of the active electronic keyhole 1011 and the passive electronic keyhole 1012 of the passive electronic lock 100 according to certain embodiments of the present disclosure. The active electronic keyhole 1011 includes two or more contact points 10111 and the passive electronic keyhole 1012 includes two or more contact points 10121. As shown in FIG. 4, the active electronic keyhole 1011 includes four contact points 10111: a first contact point 101111, a second contact point 101112, a third contact point 101113, and a fourth contact point 101114. The passive electronic keyhole 1012 includes four contact points 10121: a first contact point 101211, a second contact point 101212, a third contact point 101213, and a fourth contact point 101214. These contact points are used to form one or more communication channels and electronic key power supply ports.

Figure 5:
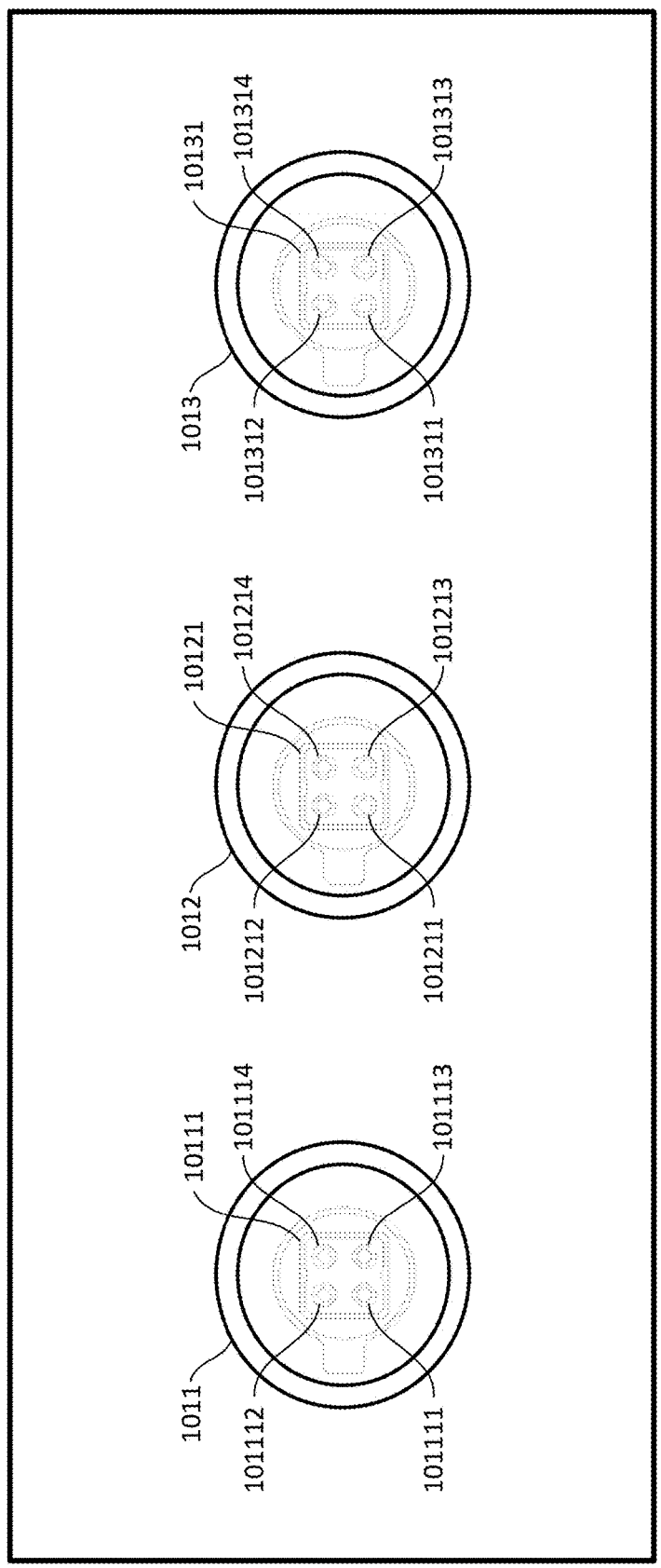
FIG. 5 is a top view of the passive electronic lock having the active electronic keyhole and two passive electronic keyholes according to certain embodiments of the present disclosure.

In another embodiment, as shown in FIG. 5, the passive electronic lock 100 includes three electronic keyholes 101: the active electronic keyhole 1011, a first passive electronic keyhole 1012, and a second passive electronic keyhole 1013. In this case, an active electronic key, a first passive electronic key and a second passive electronic key (not shown in FIG. 5) are required to lock and unlock the passive electronic lock 100. The active electronic keyhole 1011 includes four contact points 10111: a first contact point 101111, a second contact point 101112, a third contact point 101113, and a fourth contact point 101114. The first passive electronic keyhole 1012 includes four contact points 10121: a first contact point 101211, a second contact point 101212, a third contact point 101213, and a fourth contact point 101214. The second passive electronic keyhole 1013 includes four contact points 10131: a first contact point 101311, a second contact point 101312, a third contact point 101313, and a fourth contact point 101314. These contact points are used to form one or more communication channels and electronic key power supply ports.

In one aspect, the present disclosure relates to a passive electronic lock 100. In certain embodiments, the passive electronic lock 100 includes a set of electronic keyholes 101 and an electronic lock controller 110. In one embodiment, the set of electronic keyholes 101 receives a set of electronic keys 200. The set of electronic keyholes 101 includes an active electronic keyhole 1011 and at least one passive electronic keyhole 1012. The active electronic keyhole 1011 receives an active electronic key 2001 and the passive electronic keyhole 1012 receives a passive electronic key 2002, as shown in FIGS. 2-3. In another embodiment, the set of electronic keyholes 101 includes the active electronic keyhole 1011 for receiving the active electronic key 2001, a first passive electronic keyhole 1012 for receiving a first passive electronic key 2002, and a second passive electronic keyhole 1013 for receiving a second passive electronic key 2003, as shown in FIG. 5. The active electronic key 2001 includes an electrical power source 206, as shown in FIG. 8. The electrical power source 206 provides electrical power supply to the active electronic key 2001, the passive electronic lock 100 and the passive electronic key 2002. The electrical power source 206 of the active electronic key 2001 provides electrical power supply to the passive electronic lock 100, the active electronic key 2001, the first passive electronic key 2002 and the second passive electronic key 2003.

Figure 6:
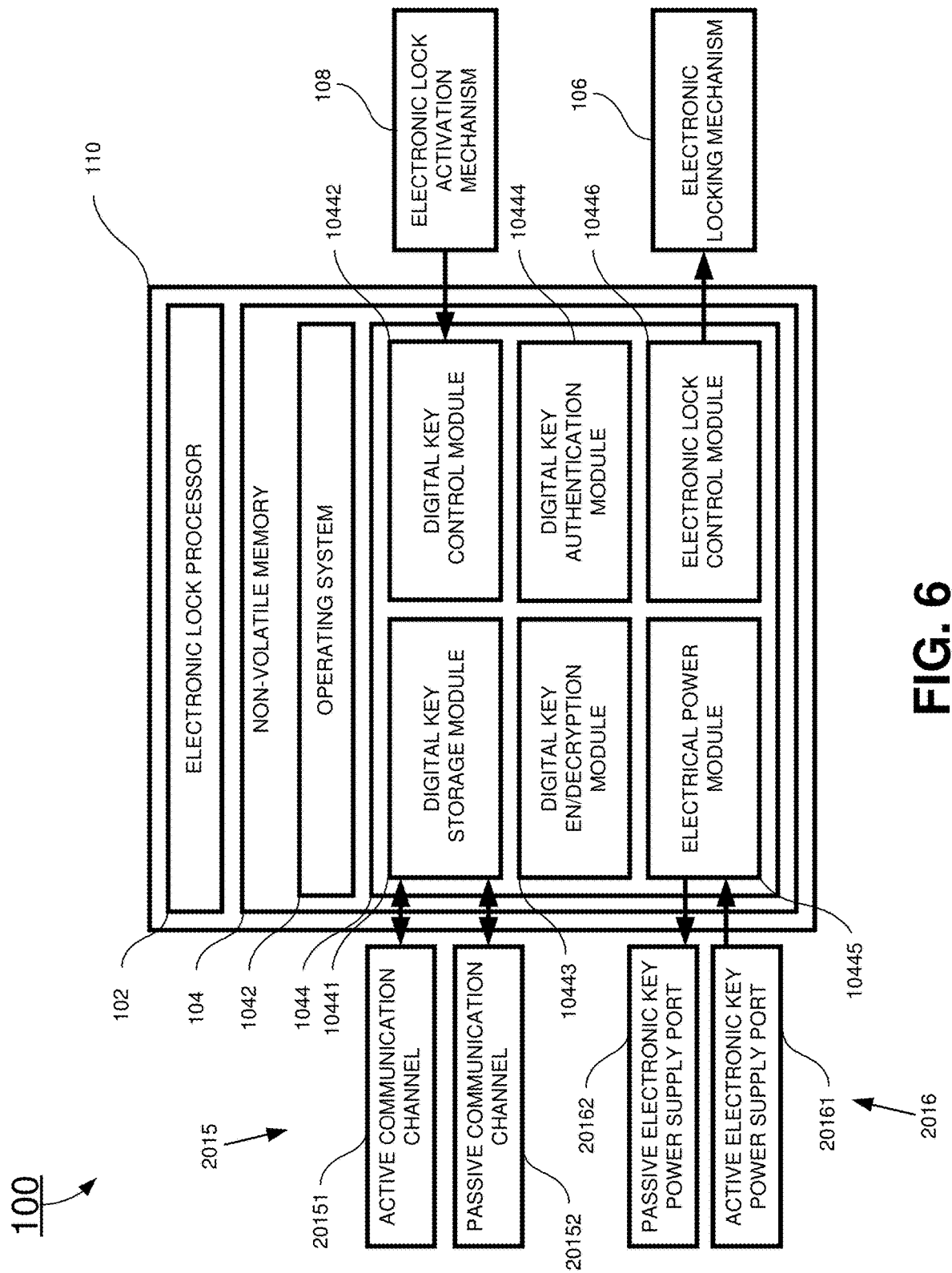
FIG. 6 is a block diagram of an exemplary passive electronic lock according to certain embodiments of the present disclosure.

In certain embodiments, as shown in FIG. 6, the electronic lock controller 110 includes an electronic lock processor 102, and a non-volatile memory of the electronic lock 104. The non-volatile memory of the electronic lock 104 stores an electronic lock operating system 1042 and electronic lock computer executable instructions 1044, and the electronic lock computer executable instructions 1044 includes: a digital key storage module 10441, a digital key control module 10442, a digital key encryption/decryption module 10443, a digital key authentication module 10444, an electrical power module 10445, and an electronic lock control module 10446.

In certain embodiments, when executed by the electronic lock processor 102, the electronic lock computer executable instructions 1044 cause the electronic lock processor 102 to:

receive, via the electrical power module 10445, electrical power from an active electronic key power supply port 20161 of the electronic lock controller 110 from the electrical power source 206 of the active electronic key 2001, when a first user inserts the active electronic key 2001 into the active electronic keyhole 1011;

provide, via the electrical power module 10445, electrical power to the passive electronic key 2002 through a passive electronic key power supply port 20162 of the electronic lock controller 110, when a second user inserts the passive electronic key 2002 into the passive electronic keyhole 1012;

receive an active digital key from the active electronic key 2001 via an active communication channel 20151 of the electronic lock controller 110, and a passive digital key from the passive electronic key 2002 via a passive communication channel 20152 of the electronic lock controller 110, respectively;

compare, by the digital key control module 10442, the active digital key and the passive digital key received with an active digital key and a passive digital key prestored in the digital key storage module 10441; and operate, by the electronic lock control module 10446 through an electronic locking mechanism 106, an electronic lock tongue 103 to lock or unlock the passive electronic lock 100, when the digital key authentication module 10444 determines that the active digital key and the passive digital key received match the active digital key and the passive digital key prestored in the digital key storage module 10441, respectively.

In certain embodiments, the passive electronic lock 100 is to be locked and unlocked only when the active electronic key 2001 and the passive electronic key 2002 are simultaneously inserted into the active electronic keyhole 1011 and the passive electronic keyhole 1012, respectively. In certain embodiments, the first user is a management staff of the passive electronic lock 100 and uses the active electronic key 2001, the second user is a customer and uses the passive electronic key 2002.

In certain embodiments, when the active electronic key 2001 is inserted into the active electronic keyhole 1011 and the passive electronic key 2002 is inserted into the passive electronic keyhole 1012, respectively, the active digital key from the active electronic key 2001 is encrypted by a digital key encryption/decryption module 20443 of the active electronic key 2001 and transmitted to the passive electronic lock 100, and the passive digital key from the passive electronic key 2002 is encrypted by a digital key encryption/decryption module 20443 of the passive electronic key 2002 and transmitted to the passive electronic lock 100.

In certain embodiments, the active digital key and the passive digital key received are decrypted by the digital key encryption/decryption module 10443 and authenticated by the digital key control module 10442 of the passive electronic lock 100. The electronic lock control module 10446 operates the electronic lock tongue 103 through the electronic locking mechanism 106 to lock or unlock the passive electronic lock 100, when the digital key authentication module 10444 determines that the active digital key and the passive digital key received match the active digital key and the passive digital key prestored in the digital key storage module 10441, respectively.

In certain embodiments, as shown in FIG. 6, the passive electronic lock 100 includes an electronic lock activation mechanism 108. In one embodiment, the electronic lock activation mechanism 108 is a push button on a side of the passive electronic lock 100. Prior to the activation, the electronic lock is locked. When the passive electronic lock 100 is ready for a new customer, the first user brings an active electronic key 2001 and a passive electronic key 2002 for activation of the passive electronic lock 100. The active electronic key 2001 is for the first user, and the passive electronic key 2002 is for the second user. When the first user inserts the active electronic key 2001 into the active electronic keyhole 1011 of the passive electronic lock 100, and the second user inserts the passive electronic key 2002 into the passive electronic keyhole 1012 of the passive electronic lock 100, the first user presses the push button, the digital key control module 10442 of the passive electronic lock 100 sends an activation instruction to the active electronic key 2001 and the passive electronic key 2002 through the active communication channel 20151 and the passive communication channel 20152, respectively. The activation instruction instructs a digital key control module 20442 of the active electronic key 2001 to generate an active digital key for the active electronic key 2001 and a digital key control module 20442 of the passive electronic key 2002 to generate a passive digital key for the passive electronic key 2002. The active digital key generated is stored in a digital key storage module 20441 of the active electronic key 2001 and the passive digital key generated is stored in a digital key storage module 20441 of the passive electronic key 2002. The active digital key generated is encrypted by a digital key en/decryption module 20443 of the active electronic key 2001 and transmitted to the electronic lock digital key storage module 10441 as the active digital key prestored, and the passive digital key generated is encrypted by a digital key en/decryption module 20443 of the passive electronic key 2002 and transmitted to the electronic lock digital key storage module 10441 as the passive digital key prestored. The active digital key prestored and the passive digital key prestored are used for authentication of the active electronic key 2001 and the passive electronic key 2002, respectively.

In certain embodiments, the active electronic keyhole 1011 includes at least two active electronic keyhole contacts 10111 and the active electronic keyhole 1011 receives the active electronic key 2001. The passive electronic keyhole 1012 includes at least two passive electronic keyhole contacts 10121 and the passive electronic keyhole 1012 receives the passive electronic key 2002. These electronic keyhole contacts 10111 and 10121 are used to provide electrical power supply and transmit digital keys between the electronic keys 200 and the passive electronic lock 100. In certain embodiments, the electronic keyhole contacts 101 include at least two electronic key contacts. In one embodiment, the active electronic keyhole 1011 of the passive electronic lock 100 has two active electronic keyhole contacts 10111, and the passive electronic keyhole 1012 of the passive electronic lock 100 has two passive electronic keyhole contacts 10121. For a passive electronic lock 100 having two electronic keyhole contacts, one electronic keyhole contact may be used as positive power supply, another electronic keyhole contact may be used as ground. These two electronic keyhole contacts may also be used as communication channel.

In another embodiment, the electronic keyhole contacts 101 include three electronic key contacts. For a passive electronic lock 100 having three electronic keyhole contacts, one electronic keyhole contact may be used as positive power supply, another electronic keyhole contact may be used as common ground, and another electronic keyhole contact may be used as communication channel along with the common ground.

In one embodiment, as shown in FIG. 4, the active electronic keyhole contacts 10111 include four contacts: an electronic keyhole first contact 101111, an electronic keyhole second contact 101112, an electronic keyhole third contact 101112, and an electronic keyhole fourth contact 101114. The passive electronic keyhole contacts 10121 include four contacts: an electronic keyhole first contact 101211, an electronic keyhole second contact 101212, an electronic keyhole third contact 101212, and an electronic keyhole fourth contact 101214. In this case, the electronic keyhole first contact 101111 and the electronic keyhole second contact 101112, as well as the electronic keyhole first contact 101211 and the electronic keyhole second contact 101212 may be used for electrical power supply. The electronic keyhole third contact 101113 and the electronic keyhole fourth contact 101114, as well as the electronic keyhole third contact 101213 and the electronic keyhole fourth contact 101214 may be used as communication channel. Additional electronic keyhole contacts may be included to add other functionalities.

In certain embodiments, as shown in FIG. 6, the passive electronic lock 100 includes the same number of communication channels 2015 as the number of electronic keyholes 101. These communication channels 2015 include the active communication channel 20151 for transmitting the active digital key between the active electronic key 2001 and the passive electronic lock 100, and the passive communication channel 20152 for transmitting the passive digital key between the passive electronic key 2002 and the passive electronic lock 100.

In certain embodiments, as shown in FIG. 6, the passive electronic lock 100 includes the same number of electronic key power supply ports 2016 as the number of electronic keyholes 101. These electronic key power supply ports 2016 include the active electronic key power supply port 20161 for receiving electrical power supply from the active electronic key 2001, and the passive electronic key power supply port 20162 for providing electrical power supply to the passive electronic key 2002 from the active electronic key 2001 through the passive electronic lock 100.

In certain embodiments, the digital key control module 10442 of the passive electronic lock 100 receives the active digital key when the active electronic key 2001 is inserted in the active electronic keyhole 1011 and the passive digital key when the passive electronic key 2002 is inserted in the passive electronic keyhole 1012, and compares the active digital key received and the passive digital key received with the active digital key and the passive digital key prestored in the digital key storage module 10441.

In certain embodiments, the digital key encryption/decryption module 10443 of the passive electronic lock 100 decrypts the active digital key received and the passive digital key received. In certain embodiments, encryption algorithms may include Triple Data Encryption Standard (DES) algorithm, Rivest-Shamir-Adleman (RSA) algorithm, Blowfish algorithm, Twofish algorithm, and Advanced Encryption Standard (AES) algorithm. One to three private keys may be used for these encryption algorithms and the length of each private key ranges from 56 bits to 256 bits.

In certain embodiments, the digital key authentication module 10444 of the passive electronic lock 100 determines whether the active digital key and the passive digital key received match the active digital key and the passive digital key prestored in the digital key storage module 10441.

In certain embodiments, the electrical power module 20445 of the active electronic key 2001 receives electrical power supply from the electrical power source 206 and provides electrical power supply to the passive electronic lock 100. The electrical power module 20445 of the passive electronic key 2002 receives electrical power supply from the active electronic key 2001 through the passive electronic lock 100. In this way, the passive electronic lock 100 will not be locked and unlocked without the active electronic key 2001 because the active electronic key 2001 provides electrical power supply to all electronic keys 200 and the passive electronic lock 100.

In certain embodiments, the electronic lock control module 10446 controls the operation of the electronic locking mechanism to lock and unlock the electronic locking system 10.

In another aspect, the present disclosure relates to an electronic locking system 10, as shown in FIGS. 1-3. In certain embodiments, the electronic locking system 10 includes: a passive electronic lock 100, and a set of electronic keys 200. The passive electronic lock 100 includes: a set of electronic keyholes 101 for the set of electronic keys 200 and an electronic lock controller 110. The set of electronic keyholes 101 includes an active electronic keyhole 1011 and at least a passive electronic keyhole 1012. The set of electronic keys 200 includes an active electronic key 2001 and at least one passive electronic key 2002. The active electronic keyhole 1011 receives the active electronic key 2001 and the passive electronic keyhole 1012 receives a passive electronic key 2002, as shown in FIGS. 2-3. The active electronic key 2001 includes an electrical power source 206, as shown in FIG. 8. The electrical power source 206 provides electrical power supply to the active electronic key 2001, the passive electronic lock 100 and the passive electronic key 2002.

In another embodiment, the set of electronic keyholes 101 includes the active electronic keyhole 1011 for receiving the active electronic key 2001, a first passive electronic keyhole 1012 for receiving a first passive electronic key 2002, and a second passive electronic keyhole 1013 for receiving a second passive electronic key 2003, as shown in FIG. 5. The electrical power source 206 of the active electronic key 2001 provides electrical power supply to the passive electronic lock 100, the active electronic key 2001, the first passive electronic key 2002 and the second passive electronic key 2003.

In certain embodiments, as shown in FIG. 6, the electronic lock controller 110 includes an electronic lock processor 102, and a non-volatile memory of the electronic lock 104. The non-volatile memory of the electronic lock 104 stores an electronic lock operating system 1042 and electronic lock computer executable instructions 1044, and the electronic lock computer executable instructions 1044 includes: a digital key storage module 10441, a digital key control module 10442, a digital key encryption/decryption module 10443, a digital key authentication module 10444, an electrical power module 10445, and an electronic lock control module 10446.

In certain embodiments, when executed by the electronic lock processor 102, the electronic lock computer executable instructions 1044 cause the electronic lock processor 102 to:

receive, via the electrical power module 10445, electrical power from an active electronic key power supply port 20161 of the electronic lock controller 110 from the electrical power source 206 of the active electronic key 2001, when a first user inserts the active electronic key 2001 into the active electronic keyhole 1011;

provide, via the electrical power module 10445, electrical power to the passive electronic key 2002 through a passive electronic key power supply port 20162 of the electronic lock controller 110, when a second user inserts the passive electronic key 2002 into the passive electronic keyhole 1012;

receive an active digital key from the active electronic key 2001 via an active communication channel 20151 of the electronic lock controller 110, and a passive digital key from the passive electronic key 2002 via a passive communication channel 20152 of the electronic lock controller 110, respectively;

compare, by the digital key control module 10442, the active digital key and the passive digital key received with an active digital key and a passive digital key prestored in the digital key storage module 10441; and operate, by the electronic lock control module 10446 through an electronic locking mechanism 106, an electronic lock tongue 103 to lock or unlock the passive electronic lock 100, when the digital key authentication module 10444 determines that the active digital key and the passive digital key received match the active digital key and the passive digital key prestored in the digital key storage module 10441, respectively.

In certain embodiments, the passive electronic lock 100 is to be locked and unlocked only when the active electronic key 2001 and the passive electronic key 2002 are simultaneously inserted into the active electronic keyhole 1011 and the passive electronic keyhole 1012, respectively. In certain embodiments, the first user is a management staff of the passive electronic lock 100 and uses the active electronic key 2001, the second user is a customer and uses the passive electronic key 2002.

In certain embodiments, when the active electronic key 2001 is inserted into the active electronic keyhole 1011 and the passive electronic key 2002 is inserted into the passive electronic keyhole 1012, respectively, the active digital key from the active electronic key 2001 is encrypted by a digital key encryption/decryption module 20443 of the active electronic key 2001 and transmitted to the passive electronic lock 100, and the passive digital key from the passive electronic key 2002 is encrypted by a digital key encryption/decryption module 20443 of the passive electronic key 2002 and transmitted to the passive electronic lock 100.

In certain embodiments, the active digital key and the passive digital key received are decrypted by the digital key encryption/decryption module 10443 and authenticated by the digital key control module 10442 of the passive electronic lock 100. The electronic lock control module 10446 operates the electronic lock tongue 103 through the electronic locking mechanism 106 to lock or unlock the passive electronic lock 100, when the digital key authentication module 10444 determines that the active digital key and the passive digital key received match the active digital key and the passive digital key prestored in the digital key storage module 10441, respectively.

In certain embodiments, as shown in FIG. 6, the passive electronic lock 100 includes an electronic lock activation mechanism 108. In one embodiment, the electronic lock activation mechanism 108 is a push button on a side of the passive electronic lock 100. Prior to the activation, the electronic lock is locked. When the passive electronic lock 100 is ready for a new customer, the first user brings an active electronic key 2001 and a passive electronic key 2002 for activation of the passive electronic lock 100. The active electronic key 2001 is for the first user, and the passive electronic key 2002 is for the second user. When the first user inserts the active electronic key 2001 into the active electronic keyhole 1011 of the passive electronic lock 100, and the second user inserts the passive electronic key 2002 into the passive electronic keyhole 1012 of the passive electronic lock 100, the first user presses the push button, the digital key control module 10442 of the passive electronic lock 100 sends an activation instruction to the active electronic key 2001 and the passive electronic key 2002 through the active communication channel 20151 and the passive communication channel 20152, respectively. The activation instruction instructs a digital key control module 20442 of the active electronic key 2001 to generate an active digital key for the active electronic key 2001 and a digital key control module 20442 of the passive electronic key 2002 to generate a passive digital key for the passive electronic key 2002. The active digital key generated is stored in a digital key storage module 20441 of the active electronic key 2001 and the passive digital key generated is stored in a digital key storage module 20441 of the passive electronic key 2002. The active digital key generated is encrypted by a digital key en/decryption module 20443 of the active electronic key 2001 and transmitted to the electronic lock digital key storage module 10441 as the active digital key prestored, and the passive digital key generated is encrypted by a digital key en/decryption module 20443 of the passive electronic key 2002 and transmitted to the electronic lock digital key storage module 10441 as the passive digital key prestored. The active digital key prestored and the passive digital key prestored are used for authentication of the active electronic key 2001 and the passive electronic key 2002, respectively.

In certain embodiments, when the active electronic key 2001 and the passive electronic key 2002 are inserted into the active electronic keyhole 1011 and the passive electronic keyhole 1012, as shown in FIG. 3, the active digital key from the active electronic key 2001 and the passive digital key from the passive electronic key 2002 are encrypted and transmitted to the passive electronic lock 100. The active digital key and the passive digital key are then decrypted by the digital key encryption/decryption module 10443 of the passive electronic lock 100, and authenticated by the digital key authentication module 10444. The electronic lock control module 10446 operates the electronic lock tongue 103 through the electronic locking mechanism 106 to lock or unlock the passive electronic lock 100 when the digital key authentication module 10444 determines that the active digital key and the passive digital key received match the active digital key and the passive digital key prestored in the digital key storage module 10441, respectively.

In certain embodiments, the active electronic keyhole 1011 includes at least two active electronic keyhole contacts 10111 and the active electronic keyhole 1011 receives the active electronic key 2001. The passive electronic keyhole 1012 includes at least two passive electronic keyhole contacts 10121 and the passive electronic keyhole 1012 receives the passive electronic key 2002. These electronic keyhole contacts 10111 and 10121 are used to provide electrical power supply and transmit digital keys between the electronic keys 200 and the passive electronic lock 100. In certain embodiments, the electronic keyhole contacts 101 include at least two electronic key contacts. In one embodiment, the active electronic keyhole 1011 of the passive electronic lock 100 has two active electronic keyhole contacts 10111, and the passive electronic keyhole 1012 of the passive electronic lock 100 has two passive electronic keyhole contacts 10121. For a passive electronic lock 100 having two electronic keyhole contacts, one electronic keyhole contact may be used as positive power supply, another electronic keyhole contact may be used as ground. These two electronic keyhole contacts may also be used as communication channel.

In another embodiment, the electronic keyhole contacts 101 include three electronic key contacts. For a passive electronic lock 100 having three electronic keyhole contacts, one electronic keyhole contact may be used as positive power supply, another electronic keyhole contact may be used as common ground, and another electronic keyhole contact may be used as communication channel along with the common ground.

In one embodiment, as shown in FIG. 4, the active electronic keyhole contacts 10111 include four contacts: an electronic keyhole first contact 101111, an electronic keyhole second contact 101112, an electronic keyhole third contact 101112, and an electronic keyhole fourth contact 101114. The passive electronic keyhole contacts 10121 include four contacts: an electronic keyhole first contact 101211, an electronic keyhole second contact 101212, an electronic keyhole third contact 101212, and an electronic keyhole fourth contact 101214. In this case, the electronic keyhole first contact 101111 and the electronic keyhole second contact 101112, as well as the electronic keyhole first contact 101211 and the electronic keyhole second contact 101212 may be used for electrical power supply. The electronic keyhole third contact 101113 and the electronic keyhole fourth contact 101114, as well as the electronic keyhole third contact 101213 and the electronic keyhole fourth contact 101214 may be used as communication channel. Additional electronic keyhole contacts may be included to add other functionalities.

In certain embodiments, as shown in FIG. 6, the passive electronic lock 100 includes the same number of communication channels 2015 as the number of electronic keyholes 101. These communication channels 2015 include the active communication channel 20151 for transmitting the active digital key between the active electronic key 2001 and the passive electronic lock 100, and the passive communication channel 20152 for transmitting the passive digital key between the passive electronic key 2002 and the passive electronic lock 100.

In certain embodiments, as shown in FIG. 6, the passive electronic lock 100 includes the same number of electronic key power supply ports 2016 as the number of electronic keyholes 101. These electronic key power supply ports 2016 include the active electronic key power supply port 20161 for receiving electrical power supply from the active electronic key 2001, and the passive electronic key power supply port 20162 for providing electrical power supply to the passive electronic key 2002 from the active electronic key 2001 through the passive electronic lock 100.

In certain embodiments, the digital key control module 10442 of the passive electronic lock 100 receives the active digital key when the active electronic key 2001 is inserted in the active electronic keyhole 1011 and the passive digital key when the passive electronic key 2002 is inserted in the passive electronic keyhole 1012, and compares the active digital key received and the passive digital key received with the active digital key and the passive digital key prestored in the digital key storage module 10441.

In certain embodiments, the digital key encryption/decryption module 10443 of the passive electronic lock 100 decrypts the active digital key received and the passive digital key received. In certain embodiments, encryption algorithms may include Triple Data Encryption Standard (DES) algorithm, Rivest-Shamir-Adleman (RSA) algorithm, Blowfish algorithm, Twofish algorithm, and Advanced Encryption Standard (AES) algorithm. One to three private keys may be used for these encryption algorithms and the length of each private key ranges from 56 bits to 256 bits.

In certain embodiments, the digital key authentication module 10444 of the passive electronic lock 100 determines whether the active digital key and the passive digital key received match the active digital key and the passive digital key prestored in the digital key storage module 10441.

In certain embodiments, the electrical power module 20445 of the active electronic key 2001 receives electrical power supply from the electrical power source 206 and provides electrical power supply to the passive electronic lock 100. The electrical power module 20445 of the passive electronic key 2002 receives electrical power supply from the active electronic key 2001 through the passive electronic lock 100. In this way, the passive electronic lock 100 will not be locked and unlocked without the active electronic key 2001 because the active electronic key 2001 provides electrical power supply to all electronic keys 200 and the passive electronic lock 100.

In certain embodiments, the electronic lock control module 10446 controls the operation of the electronic locking mechanism to lock and unlock the electronic locking system 10.

Figure 7:
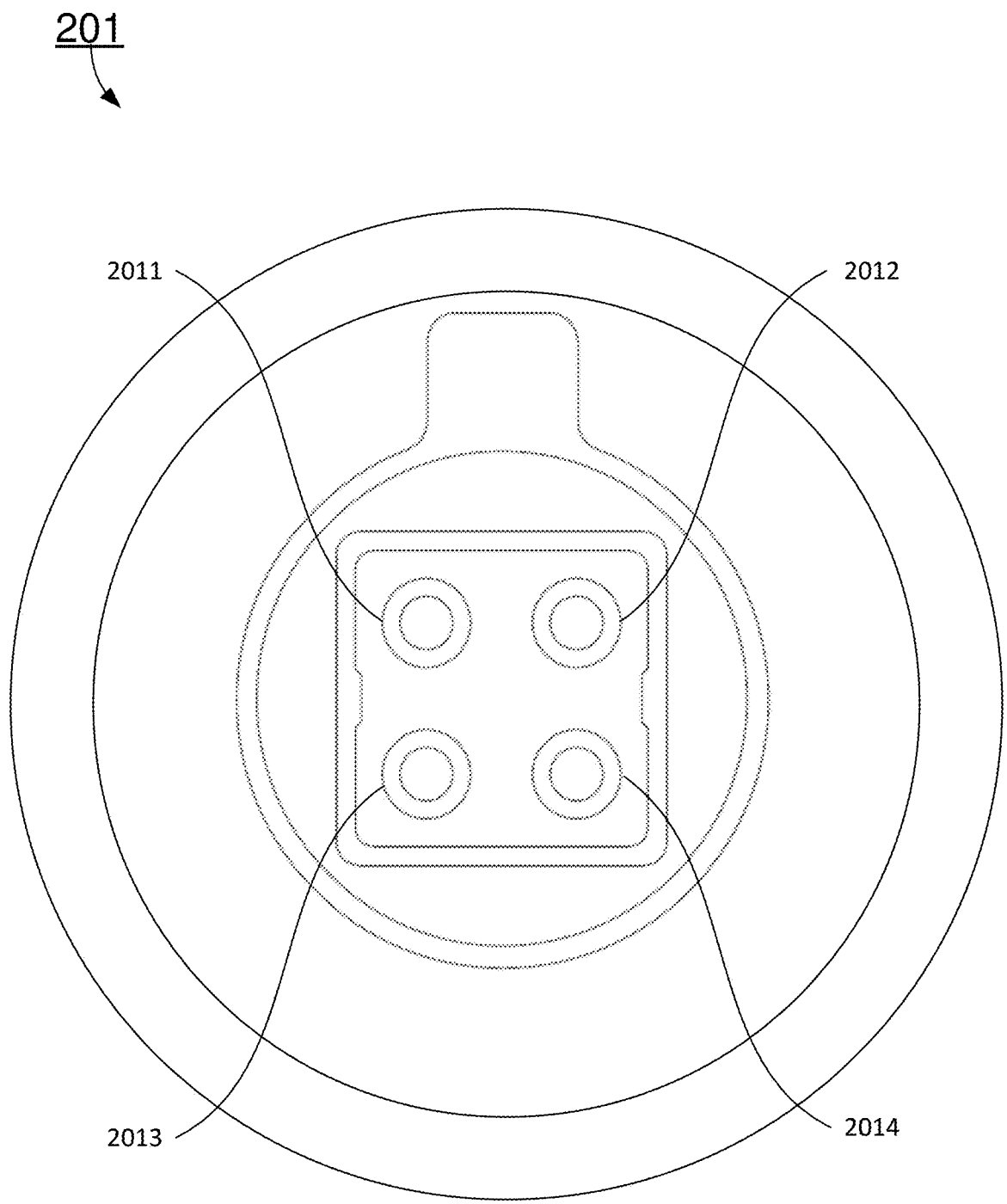
FIG. 7 shows a set of electronic key contacts of an exemplary electronic key according to certain embodiments of the present disclosure.

Each of the passive electronic key 2002 and the active electronic key 2001 includes two or more electronic key contacts 201. These electronic key contacts 201 are used to provide electrical power supply and transmit digital keys between the electronic keys 200 and the passive electronic lock 100. In certain embodiments, the electronic key contacts 201 include at least two electronic key contacts. In one embodiment, for an electronic key having two electronic key contacts, one electronic key contact may be used as positive power supply, one electronic key contact may be used as ground. These two electronic key contacts may also be used as communication channel. In another embodiment, for an electronic key having three electronic key contacts, one electronic key contact may be used as positive power supply, another one electronic key contact may be used as common ground, and another electronic key contact may be used as communication channel along with the common ground. In one embodiment, as shown in FIG. 7, the electronic key contacts 201 include four contacts: an electronic key first contact 2011, an electronic key second contact 2012, an electronic key third contact 2013, and an electronic key fourth contact 2014. In this embodiment, the electronic key first contact 2011 and the electronic key second contact 2012 may be used for electrical power supply, and the electronic key third contact 2013 and the electronic key fourth contact 2014 may be used as communication channel. Additional electronic key contacts may be included to add other functionalities.

In certain embodiments, as shown in FIG. 8 and FIG. 9, each of the set of electronic keys 200 includes: an electronic key processor 202, and a non-volatile memory 204. The non-volatile memory 204 stores an operating system 2042 and computer executable instructions 2044. The computer executable instructions 2044 include: the digital key storage module 20441, a digital key control module 20442, a digital key encryption/decryption module 20443, and an electrical power module 20445.

In certain embodiments, the digital key control module 20442 of the active electronic key 2001 generates an active digital key for the active electronic key 2001 and the digital key control module 20442 of the passive electronic key 2002 generates a passive digital key for the passive electronic key 2002 during the activation process of the passive electronic lock 100 respectively. The active digital key and the passive digital key are transmitted to and stored in the passive electronic lock 100 for authentication of the set of electronic keys 200.

In certain embodiments, the digital key storage module 20441 of the active electronic key 2001 receives and stores the active digital key from the digital key control module 20442 of the active electronic key 2001. The digital key storage module 20441 of the passive electronic key 2002 receives and stores the passive digital key from the digital key control module 20442 of the passive electronic key 2002.

In certain embodiments, the digital key encryption/decryption module 20443 of the active electronic key 2001 encrypts the active digital key before transmitting out. The digital key encryption/decryption module 20443 of the passive electronic key 2002 encrypts the passive digital key before transmitting out. In certain embodiments, encryption algorithms may include Triple Data Encryption Standard (DES) algorithm, Rivest-Shamir-Adleman (RSA) algorithm, Blowfish algorithm, Twofish algorithm, and Advanced Encryption Standard (AES) algorithm. One to three private keys may be used for these encryption algorithms and the length of each private key ranges from 56 bits to 256 bits.

In certain embodiments, the electrical power module 20445 of the active electronic key 2001 receives electrical power supply from the electrical power source 206 and provides electrical power supply to the passive electronic lock 100, and the electrical power module 20445 of the passive electronic key 2002 receives electrical power supply from the active electronic key 2001 through the passive electronic lock 100. In this way, the passive electronic lock 100 will not be locked and unlocked without the active electronic key 2001 because the active electronic key 2001 provides electrical power supply to all electronic keys 200 and the passive electronic lock 100.

In certain embodiments, when executed by the electronic key processor 202, the computer executable instructions 2044 cause the electronic key processor 202 to:

provide, via the electrical power module 20445 of the active electronic key 2001, electrical power supply through an active electronic key power supply port 20161 to the passive electronic lock 100, and providing the active digital key to the passive electronic lock 100 through an active communication channel 20151 of the active electronic key 2001, when the first user inserts the active electronic key 2001 into an active electronic keyhole 1011 of the passive electronic lock 100;

provide, via the electrical power module 20445 of the active electronic key 2001, electrical power supply to the passive electronic key 2002 through a passive electronic key power supply port 20162 from the passive electronic lock 100, and providing the passive digital key to the passive electronic lock 100 through a passive communication channel 20152 of the passive electronic key 2002, when the active electronic key 2001 is inserted in the active electronic keyhole 1011 of the passive electronic lock 100, and a second user inserts the passive electronic key 2002 into a passive electronic keyhole 1012 of the passive electronic lock 100;

when the passive electronic lock 100 receives the active digital key from the active electronic key 2001 and the passive digital key from the passive electronic key 2002, the digital key control module 10442 of the passive electronic lock 100 compares the active digital key and the passive digital key received with an active digital key and a passive digital key prestored in the digital key storage module 10441 of the passive electronic lock 100; and operate, by an electronic lock control module 10446 of the passive electronic lock 100, an electronic lock tongue 103 through an electronic locking mechanism 106 to lock and unlock the passive electronic lock 100, when a digital key authentication module 10444 of the passive electronic lock 100 determines that the active digital key received and the passive digital key received are the same as a prestored active digital key and a prestored passive digital key respectively.

In certain embodiments, the electrical power source 206 includes at least one of a battery and a rechargeable battery. The rechargeable battery includes at least one of: a lead-acid rechargeable battery, a nickel cadmium (NiCd) rechargeable battery, a nickel metal hydride (NiMH) rechargeable battery, a lithium ion (Li-ion) rechargeable battery, and a lithium ion polymer (Li-ion polymer) rechargeable battery. In certain embodiments, the active electronic key 2001 includes an active electronic key charging port 2017, as shown in FIGS. 2-3, and the active electronic key charging port 2017 is used to charge the rechargeable battery.

In yet another aspect, the present disclosure relates to a method 1000 of using an electronic locking system 10 having a passive electronic lock 100. In certain embodiments, the method 1000 includes:

installing the electronic locking system 10, and the electronic locking system 10 includes a passive electronic lock 100, an active electronic key 2001 and at least a passive electronic key 2002;

inserting, by a first user, the active electronic key 2001 into an active electronic keyhole 1011 of the passive electronic lock 100, the active electronic key 2001 includes an electrical power source 206 to provide electrical power supply to the passive electronic lock 100 through an active electronic key power supply port 20161 of the active electronic key 2001, and providing, by the active electronic key 2001, an active digital key to the passive electronic lock 100 through an active communication channel 20151 of the active electronic key 2001;

inserting, by a second user while the active electronic key 2001 is inserted in the active electronic keyhole 1011 of the passive electronic lock 100, the passive electronic key 2002 into a passive electronic keyhole 1012 of the passive electronic lock 100 to receive electrical power supply from the passive electronic lock 100 through an electrical power module 20445 of the passive electronic key 2002 and a passive electronic key power supply port 20162 from the passive electronic lock 100, and providing, by the passive electronic key 2002, a passive digital key to the passive electronic lock 100 through a passive communication channel 20152 of the passive electronic key 2002;

comparing, by a digital key control module 10442 of the passive electronic lock 100, the active digital key and the passive digital key received with an active digital key and a passive digital key prestored in a digital key storage module 10441 of the passive electronic lock 100; and operating, by an electronic lock control module 10446 of the passive electronic lock 100, an electronic lock tongue 103 of the passive electronic lock 100 through an electronic locking mechanism 106 to lock and unlock the passive electronic lock 100, when the digital key authentication module 10444 of the passive electronic lock 100 determines that the active digital key and the passive digital key received match the active digital key and the passive digital key prestored in the digital key storage module 10441 of the passive electronic lock 100, respectively.

Figure 10:
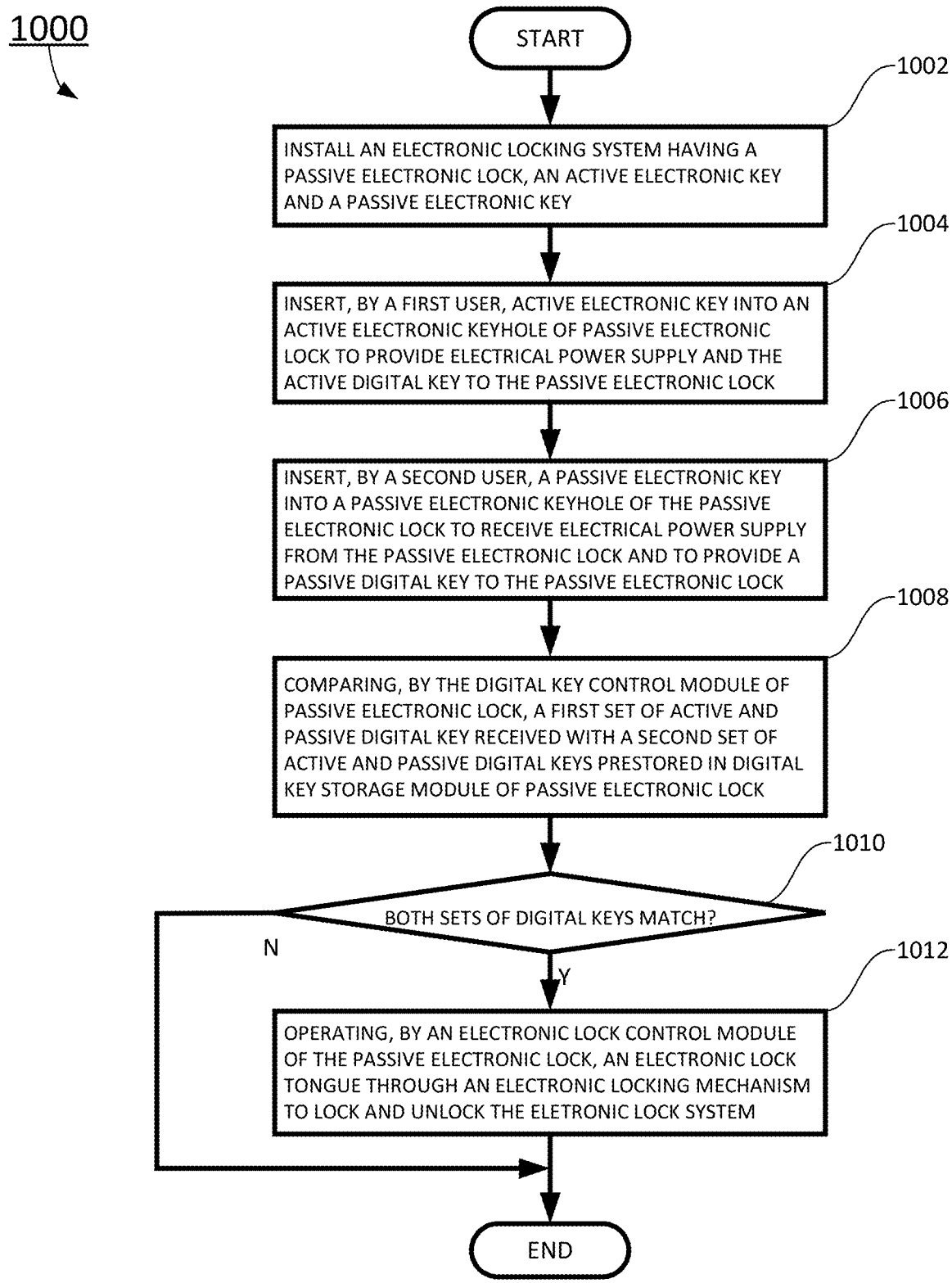
FIG. 10 shows a flowchart of a method of using the passive electronic lock according to certain embodiments of the present disclosure.

Referring now to FIG. 10, a flowchart of the method 1000 of using the electronic locking system 10 to operate the passive electronic lock 100 is shown according to certain embodiments of the present disclosure.

At block 1002, the electronic locking system 10 is installed. In certain embodiments, the electronic locking system 10 includes a passive electronic lock 100, at least an active electronic key 2001 and at least a passive electronic key 2002. The passive electronic lock 100 includes at least an active electronic keyhole 1011 for receiving the active electronic key 2001, and at least a passive electronic keyhole 1012 for receiving the passive electronic key 2002 as shown in FIG. 2 and FIG. 3.

At block 1004, the first user inserts the active electronic key 2001 into the active electronic keyhole 1011 of the passive electronic lock 100. The active electronic key 2001 includes an electrical power source 206 to provide electrical power supply to the passive electronic lock 100 through an active electronic key power supply port 20161 of the active electronic key 2001. Additionally, the active electronic key 2001 provides an active digital key to the passive electronic lock 100 through an active communication channel 20151 of the active electronic key 2001. Since the active electronic key 2001 provides electrical power supply to the entire electronic locking system 10, the electronic locking system 10 will not function without the active electronic key 2001. Customarily, the first user is a bank employee who manages the safe deposit box where the passive electronic lock 100 is installed.

At block 1006, while the active electronic key 2001 is still in the active electronic keyhole 1011 of the passive electronic lock 100, a second user inserts the passive electronic key 2002 into the passive electronic keyhole 1012 of the passive electronic lock 100 to receive electrical power supply from the passive electronic lock 100 through an electrical power module 20445 of the passive electronic key 2002 and a passive electronic key power supply port 20162 from the passive electronic lock 100, and the passive electronic key 2002 provides a passive digital key to the passive electronic lock 100 through a passive communication channel 20152 of the passive electronic key 2002. Since the passive electronic key 2002 does not have electrical power supply, the electronic locking system 10 will not function with only the passive electronic key 2002. Customarily, the second user is a customer who rents the safe deposit box where the passive electronic lock 100 is installed.

At block 1008, when the passive electronic lock 100 receives the active digital key from the active electronic key 2001 and the passive digital key from the passive electronic key 2002, the digital key control module 10442 of the passive electronic lock 100 compares the active digital key and the passive digital key received with an active digital key and a passive digital key prestored in the digital key storage module 10441 of the passive electronic lock 100.

At query block 1010, the digital key authentication module 10444 of the passive electronic lock 100 determines whether the active digital key and the passive digital key received match the active digital key and the passive digital key prestored, respectively. When the active digital key and the passive digital key received match the active digital key and the passive digital key prestored, respectively, the method 1000 proceeds to block 1012. Otherwise, the method 1000 is terminated.

At block 1012, when the active digital key and the passive digital key received match the active digital key and the passive digital key prestored, respectively, an electronic lock control module 10446 of the passive electronic lock 100 operates an electronic lock tongue 103 of the passive electronic lock 100 through an electronic locking mechanism 106 to lock and unlock the passive electronic lock 100. The electronic lock tongue 103 is in retracted state when the passive electronic lock 100 is unlocked, and the electronic lock tongue 103 is in extended state when the passive electronic lock 100 is locked.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A passive electronic lock, comprising:
a plurality of electronic keyholes for receiving a plurality of electronic keys, wherein the plurality of electronic keyholes comprises an active electronic keyhole and at least one passive electronic keyhole, the active electronic keyhole receives an active electronic key, the passive electronic keyhole receives a passive electronic key, the active electronic key comprises a digital key storage module, a digital key control module, an digital en/decryption module, and an electrical power source, the passive electronic key comprises a digital key storage module, a digital key control module, an digital en/decryption module, and the electrical power source of the active electronic key provides electrical power supply to the active electronic key, the passive electronic lock and the passive electronic key; and an electronic lock controller, wherein the electronic lock controller comprises an electronic lock processor, and a non-volatile memory of the electronic lock storing an electronic lock operating system and electronic lock computer executable instructions, and the electronic lock computer executable instructions comprise: a digital key storage module, a digital key control module, a digital key encryption/decryption module, a digital key authentication module, an electrical power module, and an electronic lock control module, when executed by the electronic lock processor, the electronic lock computer executable instructions cause the electronic lock processor to:

receive, via the electrical power module, electrical power from an active electronic key power supply port of the electronic lock controller from the electrical power source of the active electronic key, when a first user inserts the active electronic key into the active electronic keyhole;

provide, via the electrical power module, electrical power to the passive electronic key through a passive electronic key power supply port of the electronic lock controller, when a second user inserts the passive electronic key into the passive electronic keyhole;

receive, simultaneously, an active digital key from the digital key storage module of the active electronic key via an active communication channel of the electronic lock controller, and a passive digital key from the digital key storage module of the passive electronic key via a passive communication channel of the electronic lock controller, when the active electronic key and the passive electronic key are both inserted into the active electronic keyhole and the passive electronic keyhole, respectively;

compare, by the digital key control module of the passive electronic lock, the active digital key and the passive digital key received with a prestored active digital key and a prestored passive digital key from the digital key storage module of the passive electronic lock; and operate, by the electronic lock control module of the passive electronic lock through an electronic locking mechanism, an electronic lock tongue to lock or unlock the passive electronic lock, when the digital key authentication module of the passive electronic lock determines that the active digital key and the passive digital key received match the prestored active digital key and the prestored passive digital key from the digital key storage module of the passive electronic lock, respectively.

2. The passive electronic lock according to claim 1, wherein the passive electronic lock is to be locked and unlocked only when the active electronic key and the passive electronic key are simultaneously inserted into the active electronic keyhole and the passive electronic keyhole of the passive electronic lock, respectively.

3. The passive electronic lock according to claim 1, wherein the first user is a management staff of the passive electronic lock and uses the active electronic key, the second user is a customer and uses the passive electronic key.

4. The passive electronic lock according to claim 1, wherein when the active electronic key is inserted into the active electronic keyhole of the passive electronic lock and the passive electronic key is inserted into the passive electronic keyhole of the passive electronic lock, respectively, the active digital key from the active electronic key is encrypted by the digital key encryption/decryption module of the active electronic key and transmitted to the passive electronic lock, and the passive digital key from the passive electronic key is encrypted by the digital key encryption/decryption module of the passive electronic key and transmitted to the passive electronic lock.

5. The passive electronic lock according to claim 1, wherein the active digital key and the passive digital key received are decrypted by the digital key encryption/decryption module and authenticated by the digital authentication module of the passive electronic lock, and the electronic lock control module of the passive electronic lock operates the electronic lock tongue through the electronic locking mechanism to lock or unlock the passive electronic lock, when the digital key authentication module of the passive electronic lock determines that the active digital key and the passive digital key received match the prestored active digital key and the prestored passive digital key from the digital key storage module of the passive electronic lock, respectively.

6. The passive electronic lock according to claim 1, wherein during an activation process of the passive electronic lock, the first user triggers an electronic lock activation mechanism, the digital key control module of the passive electronic lock sends an activation instruction to the active electronic key and the passive electronic key through the active communication channel and the passive communication channel, respectively, the activation instruction instructs the digital key control module of the active electronic key to generate the prestored active digital key for the active electronic key and the digital key control module of the passive electronic key to generate the prestored passive digital key for the passive electronic key, the prestored active digital key generated and the prestored passive digital key generated are stored in the digital key storage module of the passive electronic lock, the prestored active digital key generated is encrypted by the digital key en/decryption module of the active electronic key and transmitted to the digital key storage module of the passive electronic lock as the prestored encrypted active digital key, the prestored passive digital key generated is encrypted by the digital key en/decryption module of the passive electronic key and transmitted to the digital key storage module of the passive electronic lock as the prestored encrypted passive digital key, and the prestored encrypted active digital key and the prestored encrypted passive digital key are used for authentication of the active electronic key and the passive electronic key, respectively.

7. The passive electronic lock according to claim 1, wherein the active electronic keyhole comprises at least two active electronic keyhole contacts and the active electronic keyhole receives the active electronic key, and the passive electronic keyhole comprises at least two passive electronic keyhole contacts and the passive electronic keyhole receives the passive electronic key.

8. The passive electronic lock according to claim 1, wherein the passive electronic lock comprises a plurality of communication channels, wherein the plurality of communication channels comprises at least the active communication channel for transmitting the active digital key between the active electronic key and the passive electronic lock, and at least the passive communication channel for transmitting the passive digital key between the passive electronic key and the passive electronic lock.

9. The passive electronic lock according to claim 1, wherein the passive electronic lock comprises a plurality of electronic key power supply ports, wherein the plurality of electronic key power supply ports comprises at least the active electronic key power supply port for receiving electrical power supply from the active electronic key, and at least the passive electronic key power supply port for providing electrical power supply to the passive electronic key from the active electronic key through the passive electronic lock.

10. An electronic locking system, comprising:
a passive electronic lock, and a plurality of electronic keys, wherein the passive electronic lock comprises:
a plurality of electronic keyholes for receiving the plurality of electronic keys, wherein the plurality of electronic keyholes comprises an active electronic keyhole and at least one passive electronic keyhole, the active electronic keyhole receives an active electronic key, the passive electronic keyhole receives a passive electronic key, the active electronic key comprises a digital key storage module, a digital key control module, an digital en/decryption module, and an electrical power source, the passive electronic key comprises a digital key storage module, a digital key control module, an digital en/decryption module, and the electrical power source provides electrical power supply to the active electronic key, the passive electronic lock and the passive electronic key; and
an electronic lock controller, wherein the electronic lock controller comprises an electronic lock processor, and a non-volatile memory of the electronic lock storing an electronic lock operating system and electronic lock computer executable instructions, and the electronic lock computer executable instructions comprise: a digital key storage module, a digital key control module, a digital key encryption/decryption module, a digital key authentication module, an electrical power module, and an electronic lock control module, when executed by the electronic lock processor, the electronic lock computer executable instructions cause the electronic lock processor to:
receive, via the electrical power module of the electronic lock controller, electrical power from an active electronic key power supply port of the electronic lock controller from the electrical power source of the active electronic key, when a first user inserts the active electronic key into the active electronic keyhole of the passive electronic lock;
provide, via the electrical power module, electrical power to the passive electronic key through a passive electronic key power supply port of the electronic lock controller, when a second user inserts the passive electronic key into the passive electronic keyhole;
receive, simultaneously, an active digital key from the digital key storage module of the active electronic key via an active communication channel of the electronic lock controller, and a passive digital key from the digital key storage module of the passive electronic key via a passive communication channel of the electronic lock controller, when the active electronic key and the passive electronic key are both inserted into the active electronic keyhole and the passive electronic keyhole, respectively;
compare, by the digital key control module of the passive electronic lock, the active digital key and the passive digital key received with a prestored active digital key and a prestored passive digital key from the digital key storage module of the passive electronic lock; and
operate, by the electronic lock control module of the passive electronic lock through an electronic locking mechanism, an electronic lock tongue to lock or unlock the passive electronic lock, when the digital key authentication module of the passive electronic lock determines that the active digital key and the passive digital key received match the prestored active digital key and the prestored passive digital key from the digital key storage module of the passive electronic lock, respectively.

11. The electronic locking system according to claim 10, wherein the passive electronic lock is to be locked and unlocked only when the active electronic key and the passive electronic key are inserted into the active electronic keyhole and the passive electronic keyhole of the passive electronic lock simultaneously, and wherein the first user is a management staff of the passive electronic lock and uses the active electronic key, the second user is a customer and uses the passive electronic key.

12. The electronic locking system according to claim 10, wherein when the active electronic key is inserted into the active electronic keyhole of the passive electronic lock and the passive electronic key is inserted into the passive electronic keyhole of the passive electronic lock, respectively, the active digital key from the active electronic key is encrypted by the digital key encryption/decryption module of the active electronic key and transmitted to the passive electronic lock, and the passive digital key from the passive electronic key is encrypted by the digital key encryption/decryption module of the passive electronic key and transmitted to the passive electronic lock.

13. The electronic locking system according to claim 10, wherein the active digital key and the passive digital key received are decrypted by the digital key encryption/decryption module and authenticated by the digital authentication module of the passive electronic lock, and the electronic lock control module of the passive electronic lock operates the electronic lock tongue through the electronic locking mechanism to lock or unlock the passive electronic lock when the digital key authentication module of the passive electronic lock determines that the active digital key and the passive digital key received match the prestored active digital key and the prestored passive digital key from the digital key storage module of the passive electronic lock, respectively.

14. The electronic locking system according to claim 10, wherein during an activation process of the passive electronic lock, the first user triggers an electronic lock activation mechanism, the digital key control module of the passive electronic lock sends an activation instruction to the active electronic key and the passive electronic key through the active communication channel and the passive communication channel, respectively, the activation instruction instructs the digital key control module of the active electronic key to generate the prestored active digital key for the active electronic key and the digital key control module of the passive electronic key to generate the prestored passive digital key for the passive electronic key, the prestored active digital key generated and the prestored passive digital key generated are stored in the digital key storage module of the passive electronic lock, the prestored active digital key generated is encrypted by the digital key en/decryption module of the active electronic key and transmitted to the digital key storage module of the passive electronic lock as the prestored encrypted active digital key, the prestored passive digital key generated is encrypted by the digital key en/decryption module of the passive electronic key and transmitted to the digital key storage module of the passive electronic lock as the prestored encrypted passive digital key, and the prestored encrypted active digital key and the prestored encrypted passive digital key are used for authentication of the active electronic key and the passive electronic key, respectively.

15. The electronic locking system according to claim 10, wherein the active electronic keyhole comprises at least two active electronic keyhole contacts and the active electronic keyhole receives the active electronic key, and the passive electronic keyhole comprises at least two passive electronic keyhole contacts and the passive electronic keyhole receives the passive electronic key.

16. The electronic locking system according to claim 10, wherein the passive electronic lock comprises a plurality of communication channels, wherein the plurality of communication channels comprises at least the active communication channel for transmitting the active digital key between the active electronic key and the passive electronic lock, and at least the passive communication channel for transmitting the passive digital key between the passive electronic key and the passive electronic lock.

17. The electronic locking system according to claim 10, wherein the passive electronic lock comprises a plurality of electronic key power supply ports, wherein the plurality of electronic key power supply ports comprises at least the active electronic key power supply port for receiving electrical power supply from the active electronic key, and at least the passive electronic key power supply port for providing electrical power supply to the passive electronic key from the active electronic key through the passive electronic lock.

18. A method of using an electronic locking system, comprising:
    installing the electronic locking system, wherein the electronic locking system comprises: a passive electronic lock having a plurality of electronic keyholes, an active electronic key and at least one passive electronic key, wherein each of the active electronic key and the passive electronic key comprises a digital key storage module, a digital key control module, a digital en/decryption module and an electrical power module;
    inserting, by a first user, the active electronic key into an active electronic keyhole of the passive electronic lock, wherein the active electronic key further comprises an electrical power source, and the electrical power source provides electrical power supply to the active electronic key, the passive electronic lock and the passive electronic key;
    inserting, by a second user while the active electronic key is inserted in the active electronic keyhole of the passive electronic lock, the passive electronic key into a passive electronic keyhole of the passive electronic lock to receive electrical power supply through a passive electronic key power supply port from the passive electronic lock, and providing, by the passive electronic key, the passive digital key to the passive electronic lock through a passive communication channel of the passive electronic key;
    receiving, by the passive electronic lock, the active digital key from the digital key storage module of the active electronic key, and the passive digital key from the digital key storage module of the passive electronic key;
    comparing, by the digital key control module of the passive electronic lock, the active digital key and the passive digital key received with a prestored active digital key and a prestored passive digital key from a digital key storage module of the passive electronic lock; and
    operating, by an electronic lock control module of the passive electronic lock, an electronic lock tongue of the passive electronic lock through an electronic locking mechanism to lock and unlock the passive electronic lock, when a digital key authentication module of the passive electronic lock determines that the active digital key and the passive digital key received match the prestored active digital key and the prestored passive digital key from the digital key storage module of the passive electronic lock, respectively.

19. The method according to claim 18, wherein each of the active electronic key and the passive electronic key comprises:
    an electronic key processor, and a non-volatile memory, wherein the non-volatile memory stores an operating system and computer executable instructions, and the computer executable instructions include:
        a digital key control module, wherein the digital key control module of the active electronic key generates the active digital key for the active electronic key and the digital key control module of the passive electronic key generates the passive digital key for the passive electronic key during an activation process of the passive electronic lock, the active digital key and the passive digital key generated are stored in the digital key storage module of the passive electronic lock, encrypted using a digital key encryption/decryption module of the active electronic key and the passive electronic key, respectively, transmitted to and stored in the digital key storage module of the passive electronic lock as the prestored active digital key and the prestored passive digital key, respectively, for authentication of the active electronic key and the passive electronic key;
        a digital key storage module, wherein the digital key storage module of the active electronic key receives and stores the active digital key from the digital key control module of the active electronic key, and the digital key storage module of the passive electronic key receives and stores the passive digital key from the digital key control module of the passive electronic key;
        the digital key encryption/decryption module, wherein the digital key encryption/decryption module of the active electronic key encrypts the active digital key before being transmitted out, and the digital key encryption/decryption module of the passive electronic key encrypts the passive digital key before being transmitted out; and
        an electrical power module, wherein the electrical power module of the active electronic key receives electrical power supply from the electrical power source and provides electrical power supply to the passive electronic lock, and the electrical power module of the passive electronic key receives electrical power supply from the active electronic key through the passive electronic lock.

20. The method according to claim 19, wherein the passive electronic lock comprises an electronic lock controller having an electronic lock processor, and a nonvolatile memory of the electronic lock storing an electronic lock operating system and electronic lock computer executable instructions, and the electronic lock computer executable instructions comprise:
- the digital key storage module, wherein the digital key storage module receives the active digital key from the active electronic key and the passive digital key from the passive electronic key generated during an activation process of the passive electronic lock, and stores the active digital key and the passive digital key received in the digital key storage module of the passive electronic lock as the prestored active digital key and the prestored passive digital key in the digital key storage module of the passive electronic lock for authentication of the active electronic key and the passive electronic key, respectively;
- the digital key control module, wherein the digital key control module receives the active digital key when the active electronic key is inserted in the active electronic keyhole and the passive digital key when the passive electronic key is inserted in the passive electronic keyhole, and compares the active digital key and the passive digital key received with the prestored active digital key and the prestored passive digital key from the digital key storage module of the passive electronic lock;
- a digital key encryption/decryption module, wherein the digital key encryption/decryption module decrypts the active digital key and the passive digital key received;
- the digital key authentication module, wherein the digital key authentication module determines whether the active digital key and the passive digital key received match the prestored active digital key and the prestored passive digital key from the digital key storage module of the passive electronic lock;
- an electrical power module, wherein the electrical power module of the passive electronic lock receives electrical power supply from the electrical power source of the active electronic key through the active electronic key power supply port and provides electrical power supply to the passive electronic lock and the passive electronic key through the passive electronic key power supply port; and
- the electronic lock control module, wherein the electronic lock control module controls the operation of the electronic locking mechanism to lock and unlock the electronic locking system.

* * * * *